United States Patent
Harvey et al.

(10) Patent No.: US 12,448,153 B2
(45) Date of Patent: Oct. 21, 2025

(54) RIGID ARTICULATED BATTEN INTEGRATED TRUSS DEVICES, SYSTEMS, AND METHODS

(71) Applicant: Roccor, LLC, Longmont, CO (US)

(72) Inventors: Thomas Jeffrey Harvey, Nederland, CO (US); Dana Turse, Broomfield, CO (US); William Francis, Lyons, CO (US); Toby Harvey, Enoch, UT (US)

(73) Assignee: Roccor, LLC, Longmont, CO (US)

( * ) Notice: Subject to any disclaimer, the term of this patent is extended or adjusted under 35 U.S.C. 154(b) by 635 days.

(21) Appl. No.: 17/710,150

(22) Filed: Mar. 31, 2022

(65) Prior Publication Data

US 2022/0363414 A1 Nov. 17, 2022

Related U.S. Application Data

(60) Provisional application No. 63/168,445, filed on Mar. 31, 2021.

(51) Int. Cl.
*B64G 1/66* (2006.01)
*B64G 1/22* (2006.01)
*B64G 1/44* (2006.01)
*B64G 1/64* (2006.01)

(52) U.S. Cl.
CPC ........... *B64G 1/66* (2013.01); *B64G 1/2223* (2023.08); *B64G 1/443* (2013.01); *B64G 1/648* (2013.01)

(58) Field of Classification Search
CPC ......... B64G 1/222; B64G 1/443; B64G 1/648
USPC ........................ 52/641, 648.1, 649.2, 649.5
See application file for complete search history.

(56) References Cited

U.S. PATENT DOCUMENTS

| | | | | |
|---|---|---|---|---|
| 1,232,221 A | * | 7/1917 | Chesebro | E06C 1/383 182/160 |
| 2,819,803 A | * | 1/1958 | Obenchain | B66C 23/703 182/2.11 |
| 3,464,522 A | * | 9/1969 | Kramer | E06C 1/12 182/211 |
| 4,226,302 A | * | 10/1980 | Roche | E06C 1/10 182/178.4 |
| 4,632,421 A | * | 12/1986 | Shamie | B62B 7/123 297/378.12 |

(Continued)

*Primary Examiner* — Brian E Glessner
*Assistant Examiner* — Adam G Barlow
(74) *Attorney, Agent, or Firm* — Terry M. Sanks, Esq.; Beusse Sanks, PLLC

(57) ABSTRACT

Deployable devices, systems, and methods are provided. Some embodiments include a system that may include: multiple frames configured to support multiple elements; multiple longerons; multiple diagonals coupled with the multiple longerons; and multiple battens. One or more battens may be coupled with at least one or more longerons and one or more frames such that the respective batten is offset at least along a length of the respective longeron with respect to at least a hinge point between the respective longeron and another longeron from the multiple longerons or along a length of the respective frame with respect to a hinge point between the respective frame and another frame from the multiple frames. Some embodiments include a method for ensuring synchronous deployment of a system that may include orienting a hinge axis coupled with at least one longeron substantially perpendicular to a hinge axis coupled with two or more frames.

21 Claims, 30 Drawing Sheets

(56) References Cited

U.S. PATENT DOCUMENTS

| | | | | |
|---|---|---|---|---|
| 5,040,349 | A * | 8/1991 | Onoda | E04B 1/19 52/645 |
| 5,244,508 | A * | 9/1993 | Colozza | B64G 1/443 136/292 |
| 5,624,046 | A * | 4/1997 | Zimmermann | B66C 23/708 212/230 |
| 7,464,502 | B2 * | 12/2008 | Sardi Herrera | E04H 9/14 52/79.5 |
| 7,963,084 | B2 * | 6/2011 | Merrifield | E04C 3/005 52/645 |
| 9,249,565 | B2 * | 2/2016 | Merrifield | B64G 1/22 |
| 9,650,781 | B2 * | 5/2017 | Merrifield | E04B 1/345 |
| 10,024,050 | B2 * | 7/2018 | Merrifield | E01D 15/124 |
| 10,407,896 | B2 * | 9/2019 | Merrifield | E04B 1/19 |
| 2002/0112417 | A1 * | 8/2002 | Brown | E04C 3/005 52/645 |
| 2005/0127640 | A1 * | 6/2005 | Worth | B62B 7/145 280/642 |
| 2006/0107611 | A1 * | 5/2006 | Merrifield | B64G 99/00 52/646 |
| 2007/0145195 | A1 * | 6/2007 | Thomson | B64G 1/2222 244/172.6 |
| 2010/0212715 | A1 * | 8/2010 | Almy | H02S 20/10 136/251 |
| 2010/0269446 | A1 * | 10/2010 | Merrifield | E01D 15/124 52/646 |
| 2017/0321414 | A1 * | 11/2017 | Merrifield | E04C 3/04 |
| 2022/0017241 | A1 * | 1/2022 | Ferroni | B64G 1/2223 |
| 2024/0253825 | A1 * | 8/2024 | Craig | B64G 1/641 |
| 2024/0270411 | A1 * | 8/2024 | Thornton | B60L 53/53 |

* cited by examiner

1400

1410 — Deploy multiple longerons and multiple frames utilizing one or more buckled battens coupled with at least one or more longerons from the multiple longerons or one or more frames from the multiple frames where the one or more buckled battens are offset with respect to one or more interconnecting hinge points between at least two or more longerons from the multiple longerons or two or more frames from the multiple frames such that the one or more buckled battens generate one or more torques around the one or more interconnecting hinge points from a compression force in the one or more buckled battens sufficient to deploy the system

FIG. 14

RIGID ARTICULATED BATTEN INTEGRATED TRUSS DEVICES, SYSTEMS, AND METHODS

CROSS-REFERENCES TO RELATED APPLICATIONS

This application is a non-provisional patent application claiming priority benefit of U.S. provisional patent application Ser. No. 63/168,445 filed on Mar. 31, 2021 and entitled "RIGID ARTICULATED BOWED BATTEN INTEGRATED TRUSS DEVICES, SYSTEMS, AND METHODS," the entire disclosure of which is herein incorporated by reference for all purposes.

BACKGROUND

A variety of tools and techniques are generally utilized to deploy and to support space-based components, such as radio frequency or photovoltaic components. For example, various boom and/or truss structures may provide for deployment and support for such components.

There may be a need for new tools and techniques that may provide a deployable, rigid backing structure for space-based applications.

SUMMARY

Deployable devices, systems, and methods are provided in accordance with various embodiments. Some embodiments include a system that may include: multiple frames configured to support multiple elements; multiple longerons; multiple diagonals coupled with the multiple longerons; and multiple battens. One or more battens from the multiple battens may be coupled with at least one or more longerons from the multiple longerons and one or more frames from the multiple frames such that the respective batten is offset at least along a length of the respective longeron with respect to at least a hinge point between the respective longeron and another longeron from the multiple longerons or along a length of the respective frame with respect to a hinge point between the respective frame and another frame from the multiple frames.

In some embodiments of the system, the one or more battens from the multiple battens coupled with the one or more longerons from the multiple longerons offset at least along the length of the respective longeron with respect to at least the hinge point between the respective longeron and the other longeron from the multiple longerons or along the length of the respective frame with respect to at least the hinge point between the respective frame and the other frame from the multiple frames are buckled at least during deployment of the system to provide torque for deployment of the system. In some embodiments of the system, one or more of the battens from the multiple battens are buckled at least at the end of deployment of the system to provide tension to one or more diagonals from the multiple diagonals.

Some embodiments of the system include one or more warping restraints that interface with one or more of the frames from the multiple frames, one or more of the longerons from the multiple longerons, and one or more of the battens from the multiple battens such that a kinematic motion of the system is restricted and a synchronous deployment of the system is ensured. The one or more warping restraints may include a planar assembly of articulating members that have freedom to at least extend in length while being resistant to at least lateral bending or torsional deformation such that the planar assembly of articulating members are configured to at least expand or distort in a plane of the articulating members and are restricted from warping out of the plane of the articulating members.

In some embodiments of the system, the multiple longerons are separated by the multiple battens from the multiple frames to provide depth in a deployed state to maintain alignment of the multiple deployed frames within a common plane. In some embodiments, the multiple longerons include multiple foldable longerons. In some embodiments, a hinge axis coupled with at least one foldable longerons from the multiple foldable longerons is substantially perpendicular to a hinge axis coupled with two or more frames from the multiple frames. One or more foldable longerons from the multiple foldable longerons may include a dog-bone hinge and/or a mechanical hinge.

In some embodiments of the system, the multiple frames are coupled with each other to form a Z-fold configuration in a stowed state. In some embodiments, the multiple frames are coupled with each other utilizing one or more hinges. In some embodiments, at least one of the one or more hinges rotate around a pivot point that is offset opposite from an outer face of a first frame from the multiple frames and from an outer face of a second frame from the multiple frames such that the first frame and the second frame make contact between a cup coupled with the first frame and a cone coupled with a second frame at an end of deployment and a spring preloads an interface between the cup and the cone. In some embodiments, at least one of the one or more hinges includes a first hinge axis that rotates around a pivot point that is offset neighboring to an outer face of a first frame of the multiple frames and an outer face of a second frame of the multiple frames and a second hinge axis that rotates the first hinge axis away from the outer face of the first frame and the outer face of the second frame as the first frame and the second frame deploy. In some embodiments, the multiple frames are coupled with each other utilizing one or more strain energy components.

In some embodiments of the system, the multiple frames include one or more pass-through areas configured for hold down and release mechanisms that rigidly connect the multiple frames together in a stowed state. In some embodiments, the multiple frames include multiple beams interconnected in a planar arrangement.

In some embodiments of the system, the multiple elements include multiple radio-frequency transmission elements; some embodiments include multiple photovoltaic energy conversion elements.

Some embodiments of the system include one or more sequencers. At least one of the one or more sequencers may include a hooked lever with a pivot such that the hooked lever hooks around at least a portion of a pin in a stowed state. The at least one of the one or more sequencers may be configured to sequentially deploy the multiple frames. In some embodiments, the pivot of the hooked lever is coupled with a first frame from the multiple frames and a hook of the hooked lever couples with at least the portion of the pin that is coupled with a second frame from the multiple frames such that the hooked lever releases from the pin through contact between the hooked lever and a stop coupled with the first frame when the first frame fully deploys. In some embodiments, the pivot of the hooked lever is coupled with a first foldable longeron from the multiple longerons and a hook of the hooked lever couples with a pin that is coupled with a second foldable longeron from the multiple longerons such that the hooked lever is released from the pin through contact with a portion of the first foldable longeron as the first foldable longeron fully deploys. In some embodiments, one or more frames from the multiple frames include at least one or more pins or one or more sockets such that: a respective pin coupled with a respective frame rotates in a respective socket of another one of the frames during deployment; and the respective pin is released from the respective socket to release the respective element frame. In some embodiments, at least the one or more pins or the one or more sockets are configured to sequentially deploy the multiple frames. Some embodiments of the system further include one or more deployment tethers that spool out during deployment to control the deployment of the system.

In some embodiments of the system, at least one batten from the multiple battens is coupled with a first longeron from the multiple longerons and a second longeron from the multiple longerons such that the at least one batten is offset with respect to a hinge point of the first longeron and a hinge point of the second longeron such that the at least one batten is in compression during deployment. In some embodiments of the system, one or more battens from the multiple battens are aligned with at least the hinge point between the respective longeron and the other longeron from the multiple longerons or the hinge point between the two or more of the frames from the multiple frames such that the one or more battens from the multiple battens are in compression during deployment and uncompressed at full deployment.

In some embodiments of the system, a hinge axis coupled with at least one longeron from the multiple longerons is substantially perpendicular to a hinge axis coupled with two or more frames from the multiple frames.

Some embodiments include a method of deploying a system. The method may include deploying multiple longerons and multiple frames utilizing one or more buckled battens coupled with at least one or more longerons from the multiple longerons or one or more frames from the multiple frames; the one or more buckled battens may be offset with respect to one or more interconnecting hinge points between at least two or more longerons from the multiple longerons or two or more frames from the multiple frames such that the one or more buckled battens generate one or more torques around the one or more interconnecting hinge points from a compression force in the one or more buckled battens sufficient to deploy the system. The method may include deploying multiple longerons and multiple frames utilizing one or more buckled battens coupled with at least one or more longerons from the multiple longerons or one or more frames from the multiple frames and offset with respect to at least a hinge point interconnecting two or more longerons from the multiple longerons or at least a hinge point interconnecting two or more frames from the multiple frames at a length that generates a torque around at least the hinge point interconnecting the two or more longerons from the multiple longerons or the hinge point interconnecting the two or more frames from the multiple frames from the compression force in the one or more buckled battens for deployment of the system.

Some embodiments of the method include utilizing one or more deployment tethers that spool out during deployment to control the deployment of the multiple frames and the multiple longerons.

In some embodiments of the method, deploying the multiple frames includes sequentially deploying each frame from the multiple frames from a stowed state. In some embodiments, deploying each frame from the multiple frames from the stowed state utilizes one or more sequencers. In some embodiments, utilizing at least one of the one or more sequencers includes hooking a hooked lever with a pivot around at least a portion of a pin in a stowed state. In some embodiments, the pivot of the hooked lever is coupled with a first frame from the multiple frames and a hook of the hooked lever couples with at least the portion of the pin that is coupled with a second frame from the multiple frames such that the hooked lever releases from the pin through contact between the hooked lever and a stop coupled with the first frame when the first frame fully deploys. In some embodiments, the pivot of the hooked lever is coupled with a first foldable longeron from the multiple longerons and a hook of the hooked lever couples with a pin that is coupled with a second foldable longeron from the multiple longerons such that the hooked lever is released from the pin through contact with a portion of the first foldable longeron as the first foldable longeron fully deploys. In some embodiments, at least one of the one or more sequencers includes at least one or more pins or one or more sockets such that: a respective pin coupled with a respective frame rotates in a respective socket of another one of the frames during deployment; and the respective pin is released from the respective socket to release the respective frame.

In some embodiments of the method, deploying the multiple longerons includes unfolding each respective longeron from the multiple longerons during deployment. Some embodiments of the method include tensioning one or more diagonals utilizing one or more of the buckled battens at full deployment.

Some embodiments of the method include orienting a hinge axis coupled with at least one longeron from the multiple longerons substantially perpendicular to a hinge axis coupled with two or more frames from the multiple frames that ensures synchronous deployment of the system.

Some embodiments of the method include incorporating one or more warping restraints that interface with one or more of the frames from the multiple frames, one or more of the longerons from the multiple longerons, and one or more of the bucked battens from the multiple battens such that a kinematic motion of the system is restricted and a synchronous deployment of the system is ensured.

In some embodiments of the method, at least one buckled batten from the one or more buckled battens is coupled with a first longeron from the multiple longerons and a second longeron from the multiple longerons such that the at least one batten is offset with respect to a hinge point of the first longeron and a hinge point of the second longeron such that the at least one batten is in compression during deployment.

Some embodiments of the method include coupling the multiple frames with each other utilizing one or more hinges to a Z-fold configuration in a stowed state. In some embodiments, at least one of the one or more hinges rotate around a pivot point that is offset opposite from an outer face of a first frame from the multiple frames and from an outer face of a second frame from the multiple frames such that the first frame and the second frame make contact between a cup coupled with the first frame and a cone coupled with a second frame at an end of deployment and a spring preloads an interface between the cup and the cone. In some embodiments, at least one of the one or more hinges includes a first hinge axis that rotates around a pivot point that is offset neighboring to an outer face of a first frame of the multiple frames and an outer face of a second frame of the multiple frames and a second hinge axis that rotates the first hinge axis away from the outer face of the first frame and the outer face of the second frame as the first frame and the second frame deploy.

Some embodiments include aligning one or more battens from the multiple battens with at least the hinge point interconnecting the two or more longerons from the multiple longerons such that the one or more of the buckled battens is in compression during deployment.

Some embodiments include a method for ensuring synchronous deployment of a system. The method may include orienting a hinge axis coupled with at least one longeron substantially perpendicular to a hinge axis coupled with two or more frames.

Some embodiments include a system that includes multiple frames coupled with one or more longerons. A hinge axis coupled with at least one longeron from the one or more longerons may be substantially perpendicular to a hinge axis coupled with two or more frames from the multiple frames.

Some embodiments include methods, systems, and/or devices as described in the specification and/or shown in the figures.

The foregoing has outlined rather broadly the features and technical advantages of embodiments according to the disclosure in order that the detailed description that follows may be better understood. Additional features and advantages will be described hereinafter. The conception and specific embodiments disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of different embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 14 shows a flow diagram of a method in accordance with various embodiments.

DETAILED DESCRIPTION

Figure 1:
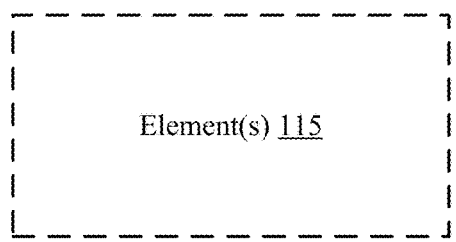
FIG. 1 shows aspects of a system in accordance with various embodiments.
Figure 1:
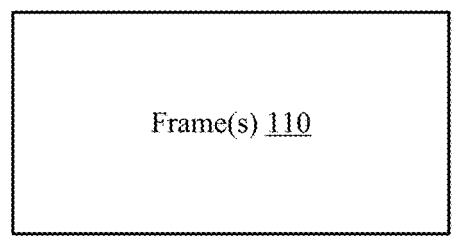
Figure 1:
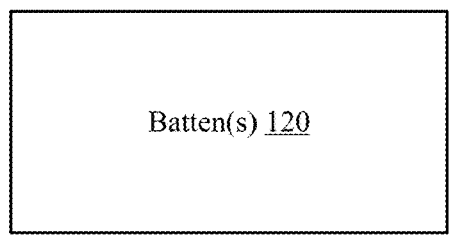
Figure 1:
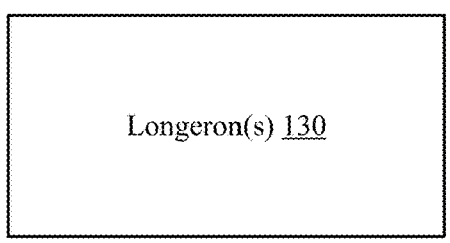
Figure 1:
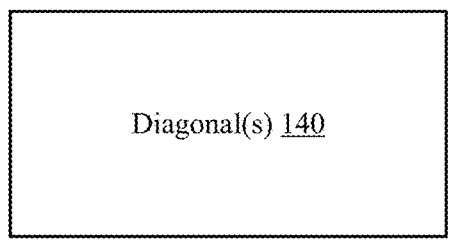
Figure 1:
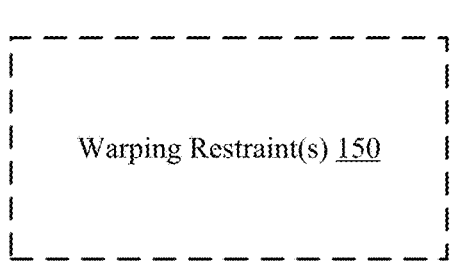
Figure 1:
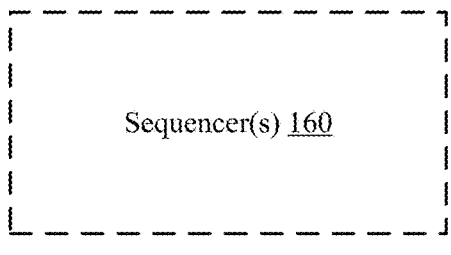

This description provides embodiments, and is not intended to limit the scope, applicability, or configuration of the disclosure. Rather, the ensuing description will provide those skilled in the art with an enabling description for implementing embodiments of the disclosure. Various changes may be made in the function and arrangement of elements.

Thus, various embodiments may omit, substitute, or add various procedures or components as appropriate. For instance, it should be appreciated that the methods may be performed in an order different than that described, and that various stages may be added, omitted, or combined. Also, aspects and elements described with respect to certain embodiments may be combined in various other embodiments. It should also be appreciated that the following systems, devices, and methods may individually or collectively be components of a larger system, wherein other procedures may take precedence over or otherwise modify their application.

Rigid articulated batten integrated truss devices, systems, and methods are provided in accordance with various embodiments. The systems, devices, and methods may support a variety of devices, such as a continuous phased array aperture off a spacecraft. Other devices may be supported, such as solar arrays. Various embodiments include one or more deployable wing structures that may utilize the various backing structures in accordance with various embodiments. The backing or truss structure may be collapsed for stowage into a small volume for launch. Upon deployment, the formation of the deep truss backing structure may provide for high deployed stiffness at a low areal mass. Furthermore, a stiff, near-zero CTE structure may provide for excellent on-orbit shape stability.

The systems, devices, and methods provided in accordance with various embodiments generally include one or more truss structures that may include multiple bays and/or half bay. A bay is generally defined as the smallest structurally independent unit cell of a truss. Some embodiments include multiple frames (which may be referred to as trays) coupled with elements (such as RF or PV elements) to form one or more panel assemblies. Some embodiments include multiple panel assemblies. Some embodiments include foldable, deployable panel assemblies that may also include one or more rigid panel assembles that may be rigidly mounted to a bus. This may facilitate the formation of a continuous aperture.

Some embodiments provide an overall structure that may be referred to as an upper deck of panel assemblies (which may form an RF aperture or other structure, such as a PV structure), and a lower deck of support elements, such as longerons. Some embodiments include tensioned diagonals that may be connected with two or more longerons across the bottom face of the truss. When assembled, these structural elements generally provide high stiffness in bending and torsion at a minimized mass. Buckled battens may provide for tensioning the diagonals. Buckled battens may also be referred to as bowed battens.

Some embodiments rely on stored strain energy within various components of the stowed structure to provide the force for deployment. While deployment may be strain-energy driven, the system may be payed-out in a controlled way and may not be a highly energetic and dynamic event.

The majority of the strain energy used to drive deployment may be generated by two types of components within the system: 1) the vertical buckled battens and 2) the kicker springs. The vertical buckled battens may be offset from the hinge-line, and therefore may generate a substantial deployment torque around those hinge-lines. The torque about the hinge-line may be highly tailorable by adjusting the offset distance and the batten design.

Some embodiments utilize kicker springs that may be installed between longeron assembly end fittings. This may provide a short-lived but high separation force at first motion, which may be when the torque across the hinge-line imparted by the buckled battens may be at its lowest.

Turning now to FIG. 1, a deployable system 100 is provided in accordance with various embodiments. Deployable system 100 may include: multiple frames 110 configured to support multiple elements 115; one or more longerons 130; multiple diagonals 140 coupled with the multiple longerons 130; and multiple battens 120. Some embodiments include multiple longerons 130. One or more battens from the multiple battens 120 may be coupled with at least one or more longerons from the multiple longerons 130 and one or more frames from the multiple frames 110 such that the respective batten is offset at least along a length of the respective longeron with respect to a hinge point between the respective longeron and another longeron from the multiple longerons 130 or along a length of the respective frame with respect to a hinge point between the respective frame and another frame from the multiple frames 110. In some embodiments of the system 100, the one or more battens from the multiple battens 120 coupled with the one or more longerons from the multiple longerons 130 offset at least along the length of the respective longeron with respect to at least the hinge point between the respective longeron and the other longeron from the multiple longerons 130 or along the length of the respective frame with respect to at least the hinge point between the respective frame and the other frame from the multiple frames 130 are buckled at least during deployment of the system to provide torque for deployment of the system. In some embodiments of the system, one or more of battens from the multiple battens 120 are buckled at least at the end of deployment of the system to provide tension to one or more diagonals from the multiple diagonals 140. For example, the multiple longerons 130 and multiple frames 110 may be configured to deploy utilizing the multiple buckled battens 120 coupled with at least one or more longerons from the multiple longerons 130 or one or more frames from the multiple frames 110 such that one or more buckled battens from the multiple buckled battens 120 are offset with respect to one or more interconnecting hinge points between at least two or more longerons from the multiple longerons 130 or two or more frames from the multiple frames 110 such that the one or more buckled battens 120 generate one or more torques around the one or more interconnecting hinge points from a compression force in the one or more buckled battens 120 sufficient to deploy the system.

Some embodiments of the system 100 include one or more warping restraints 150 that interface with one or more of the frames from the multiple frames 110, one or more of the longerons from the multiple longerons 130, and one or more of the battens from the multiple battens 120 such that a kinematic motion of the system 100 is restricted and a synchronous deployment of the system 100 is ensured. The one or more warping restraints 150 may include a planar assembly of articulating members that have freedom to at least extend in length while being resistant to at least lateral bending or torsional deformation such that the planar assembly of articulating members are configured to at least expand or distort in a plane of the articulating members and are restricted from warping out of the plane of the articulating members.

In some embodiments of the system 100, the multiple longerons 130 are separated by the multiple battens 120 from the multiple frames 110 to provide depth in a deployed state to maintain alignment of the multiple deployed frames 110 within a common plane. In some embodiments, the multiple longerons 130 include multiple foldable longerons. In some embodiments of the system 100, a hinge axis coupled with at least one foldable longeron from the multiple foldable longerons 130 is substantially perpendicular to a hinge axis coupled with two or more frames from the multiple frames 110. This may help ensure synchronous deployment of system 100. One or more foldable longerons from the multiple foldable longerons 130 may include a dog-bone hinge and/or a mechanical hinge.

In some embodiments of the system 100, the multiple frames 110 are coupled with each other to form a Z-fold configuration in a stowed state. In some embodiments, the multiple frames 110 are coupled with each other utilizing one or more hinges. In some embodiments, at least one of the one or more hinges rotate around a pivot point that is offset opposite from an outer face of a first frame from the multiple frames 110 and from an outer face of a second frame from the multiple frames 110 such that the first frame and the second frame make contact between a cup coupled with the first frame and a cone coupled with a second frame at an end of deployment and a spring preloads an interface between the cup and the cone. In some embodiments, at least one of the one or more hinges includes a first hinge axis that rotates around a pivot point that is offset neighboring to an outer face of a first frame of the multiple frames 110 and an outer face of a second frame of the multiple frames 110 and a second hinge axis that rotates the first hinge axis away from the outer face of the first frame and the outer face of the second frame as the first frame and the second frame deploy. In some embodiments, the multiple frames 110 are coupled with each other utilizing one or more strain energy components.

In some embodiments of the system 100, the multiple frames 110 include one or more pass-through areas configured for hold down and release mechanisms that rigidly connect the multiple frames 110 together in a stowed state. In some embodiments, the multiple frames 110 include multiple beams interconnected in a planar arrangement.

In some embodiments of the system 100, the multiple elements 115 include at least multiple radio-frequency transmission elements. Some embodiments of the system 100 include multiple elements that include multiple photovoltaic energy conversion elements.

Some embodiments of the system 100 include one or more sequencers 160. At least one of the one or more sequencers 160 may include a hooked lever with a pivot such that the hooked lever hooks around at least a portion of a pin in a stowed state. The at least one of the one or more sequencers 160 may be configured to sequentially deploy the multiple frames 110. In some embodiments, the pivot of the hooked lever is coupled with a first frame from the multiple frames 110 and a hook of the hooked lever couples with at least the portion of the pin that is coupled with a second frame from the multiple frames 110 such that the hooked lever releases from the pin through contact between the hooked lever and a stop coupled with the first frame when the first frame fully deploys. In some embodiments, the pivot of the hooked lever is coupled with a first foldable longeron from the multiple longerons 130 and a hook of the hooked lever couples with a pin that is coupled with a second foldable longeron from the multiple longerons 130 such that the hooked lever is released from the pin through contact with a portion of the first foldable longeron as the first foldable longeron fully deploys.

In some embodiments of the system 100, the one or more sequencers are formed from one or more of frames from the multiple frames 110 that include at least one or more pins or one or more sockets such that: a respective pin coupled with a respective frame rotates in a respective socket of another one of the frames during deployment; the respective pin is released from the respective socket to release the respective element frame. In some embodiments, at least the one or more pins or the one or more sockets are configured to sequentially deploy the multiple frames 110. Some embodiments of the system 100 further include one or more deployment tethers that spool out during deployment to control the deployment of the system.

In some embodiments of the system 100, at least one batten from the multiple battens 120 is coupled with a first longeron from the multiple longerons 130 and a second longeron from the multiple longerons 130 such that the at least one batten is offset with respect to a hinge point of the first longeron and a hinge point of the second longeron such that the at least one batten is in compression during deployment. In some embodiments of the system 100, one or more battens from the multiple battens 120 are aligned with at least the hinge point between the respective longeron and the other longeron from the multiple longerons 130 or the hinge point between the two or more of the frames from the multiple frames 110 such that the one or more battens from the multiple battens 120 are in compression during deployment and uncompressed at full deployment.

Figure 2A:
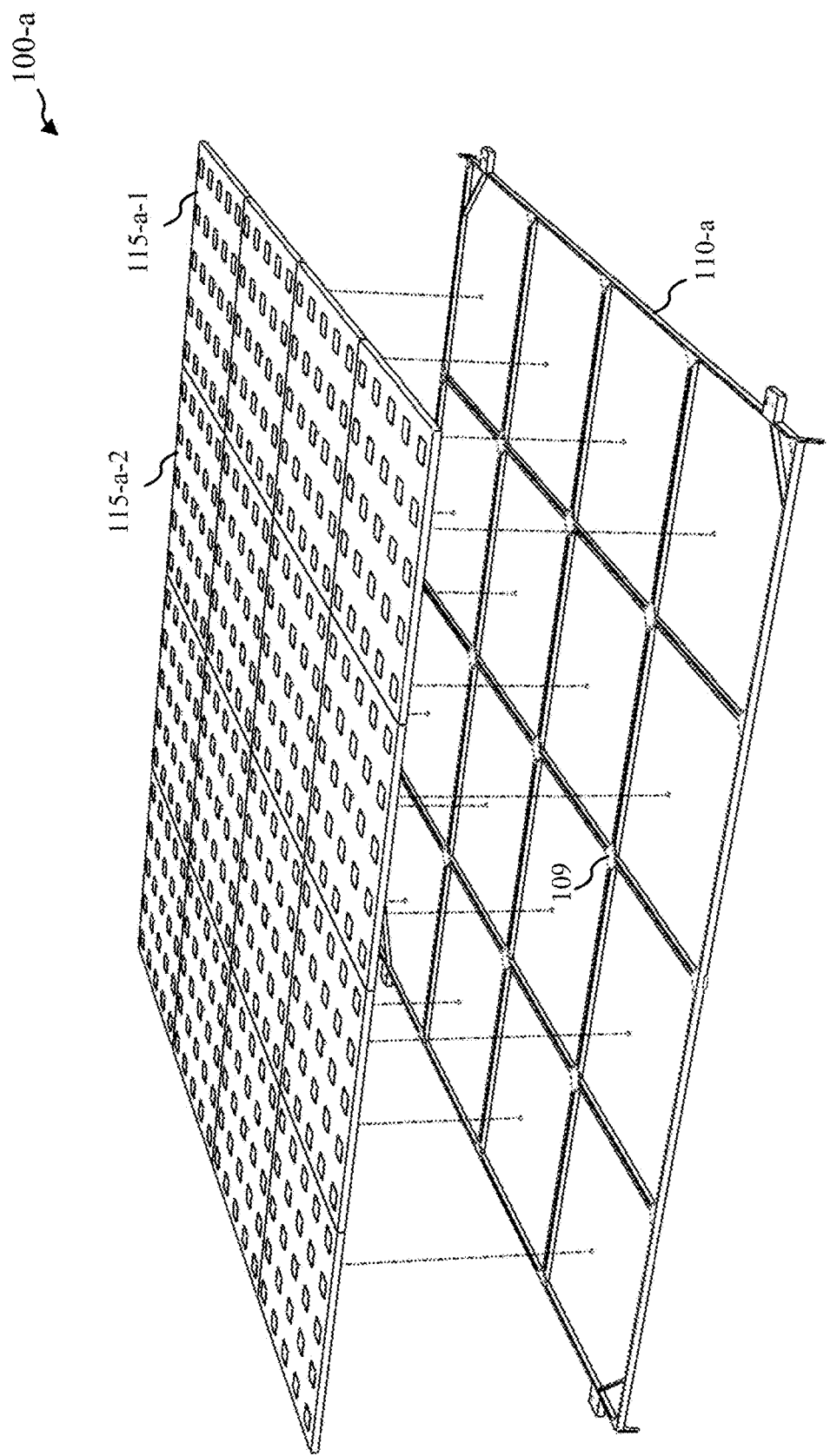
FIG. 2A and FIG. 2B show aspects of systems in accordance with various embodiments.
Figure 2B:
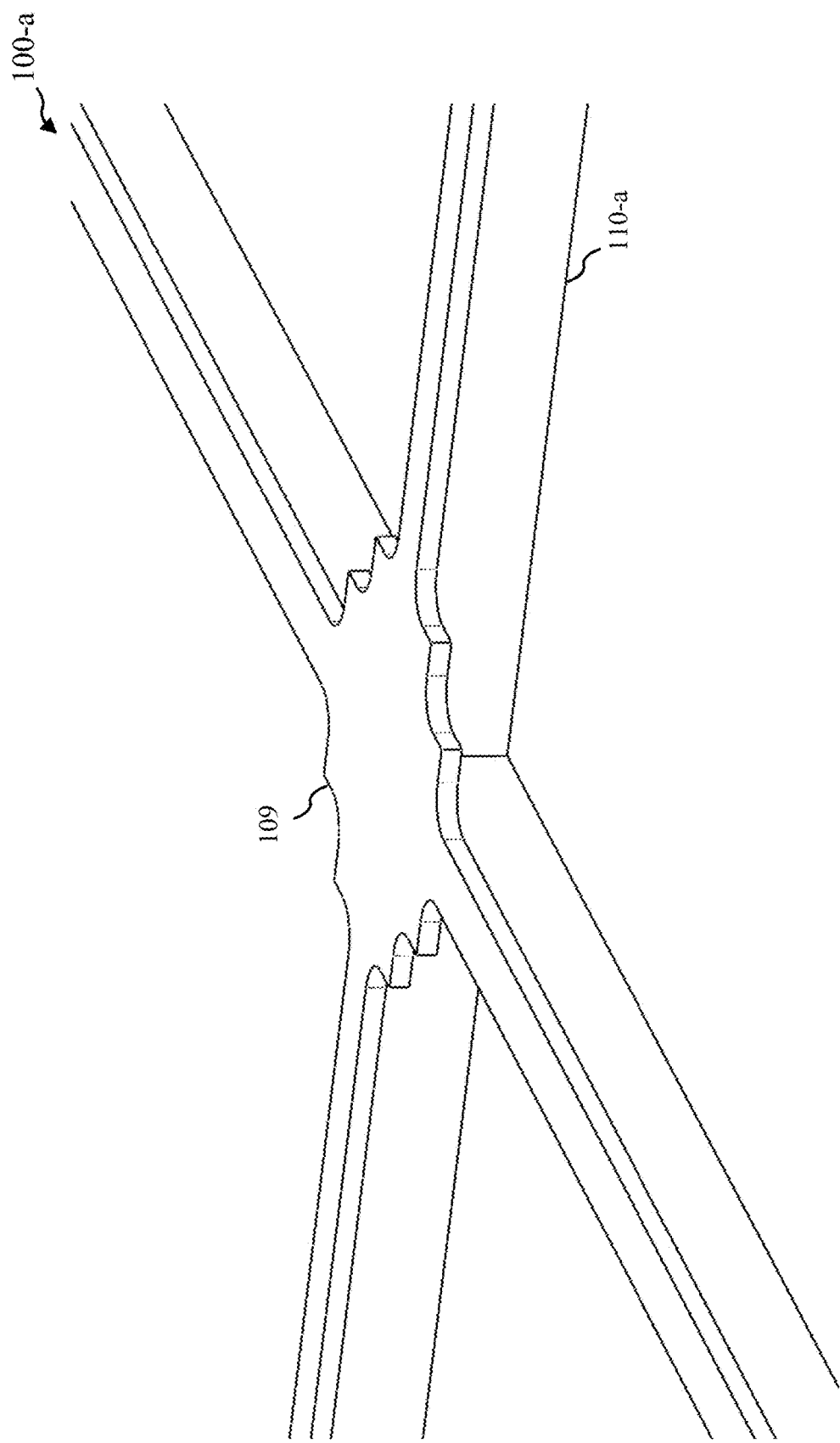

FIG. 2A and FIG. 2B show aspects of a system 100-a in accordance with various embodiments. System 100-a may be an example of aspects of systems and/or methods of FIG. 1, FIG. 3A, FIG. 3B, FIG. 3C, FIG. 4A, FIG. 4B, FIG. 4C, FIG. 4D, FIG. 4E, FIG. 4F, FIG. 5, FIG. 6, FIG. 7, FIG. 8, FIG. 9A, FIG. 9B, FIG. 10A, FIG. 10B, FIG. 10C, FIG. 10D, FIG. 10E, FIG. 11A, FIG. 11B, FIG. 11C, FIG. 12, FIG. 13A, FIG. 13B, and/or FIG. 14. System 100-a may include multiple elements, which may be referred to as tiles; two elements 115-a-1 and 115-a-2 are specifically called out, though 16 elements may be shown. Elements 115-a may include radiofrequency components on a front side of each respective element and/or a radiating surface on a back side of each respective element. System 100-a may include a frame 110-a, which may be of a rigid, composite construction. The frame 110-a may provide an interface to mount the elements 115-a. The frame 110-a may have features outside of the element area for other components, including, but not limited to, hinge and/or truss attachment(s) and/or element backside interface(s) 109 (as highlighted in FIG. 2B). Frame 110-a may have pass-through areas, which may facilitate hold down and release mechanism(s) (HDRMs), for example. Some embodiments include additional frames 110-a.

The frame 110-a along with the other frames generally forms a top structural layer of the truss and may provide a flat interface for mounting elements, such as RF or PV tiles. Some embodiments include one or more center panels that may include one or more frames, such as frame 110-a, that may be integrated with a payload and may be mounted directly on a spacecraft. The deployable frames, such as frame 110-a, may form one or more wings that may be supported by the integrated truss. In some embodiments, a center panel and two wings may form a long, continuous aperture.

The frame 110-a generally provides a framework that may be constructed from a variety of materials, including, but not limited to, high-modulus, low-CTE CFRP. The framework may include box beams running along the edges of the frame 110-a in the deployed, or longitudinal, direction, and I-beams for the central longitudinal and transverse lattice elements.

In some embodiments, a laminate architecture design (i.e., specific composite materials, fiber orientation, and ply stack-up) combined with the geometric design generally results in frame 110-a with high structural stiffness and near-zero CTE at a minimized mass and volume. Of particular importance to the tray design may be the axial stiffness (EA) of the elements, the bending stiffness (EI) of the elements and the manufactured flatness, robustness to launch loads, and/or on-orbit thermal stability.

In some embodiments, the elements 115-a (or tiles) may be attached to the frame 110-a using a bolted attachment. In general, the elements 115-a may be attached such that they may not be tightly coupled structurally to the frame 110-a; structural loads imparted in the frame 110-a may not be reacted through the elements 115-a themselves.

Figure 3A:
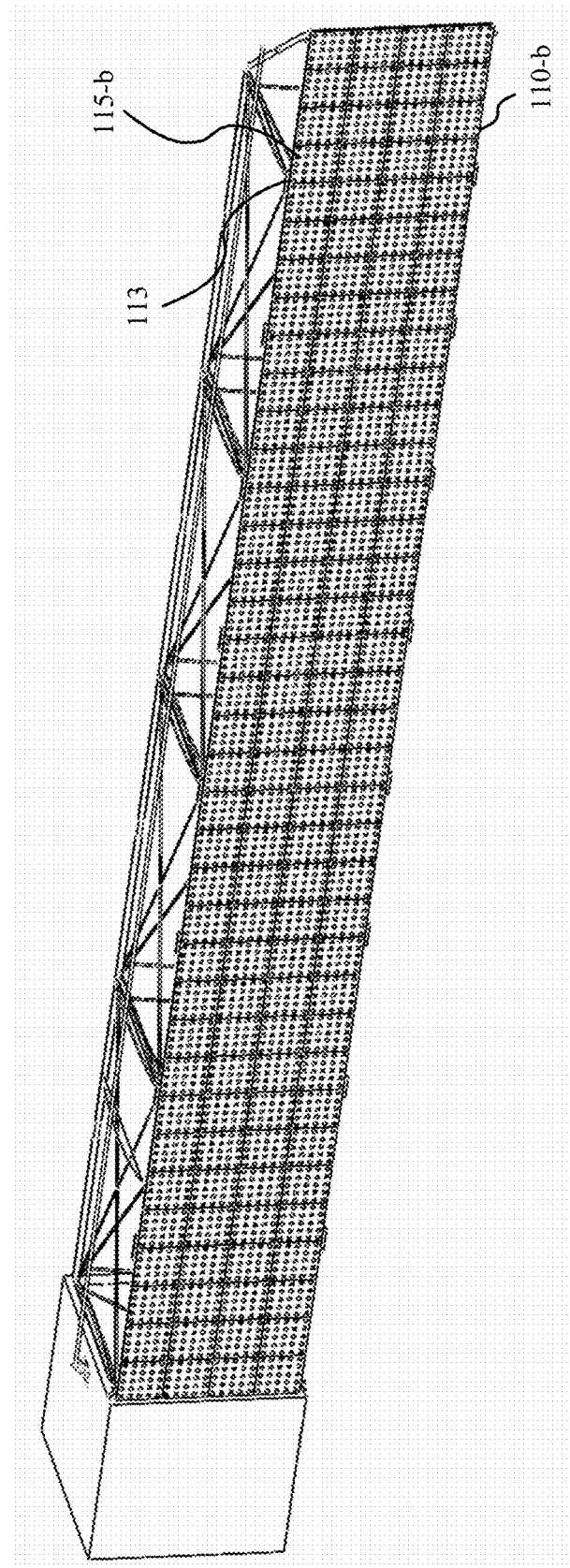
FIG. 3A, FIG. 3B, and FIG. 3C show aspects of systems in accordance with various embodiments.
Figure 3B:
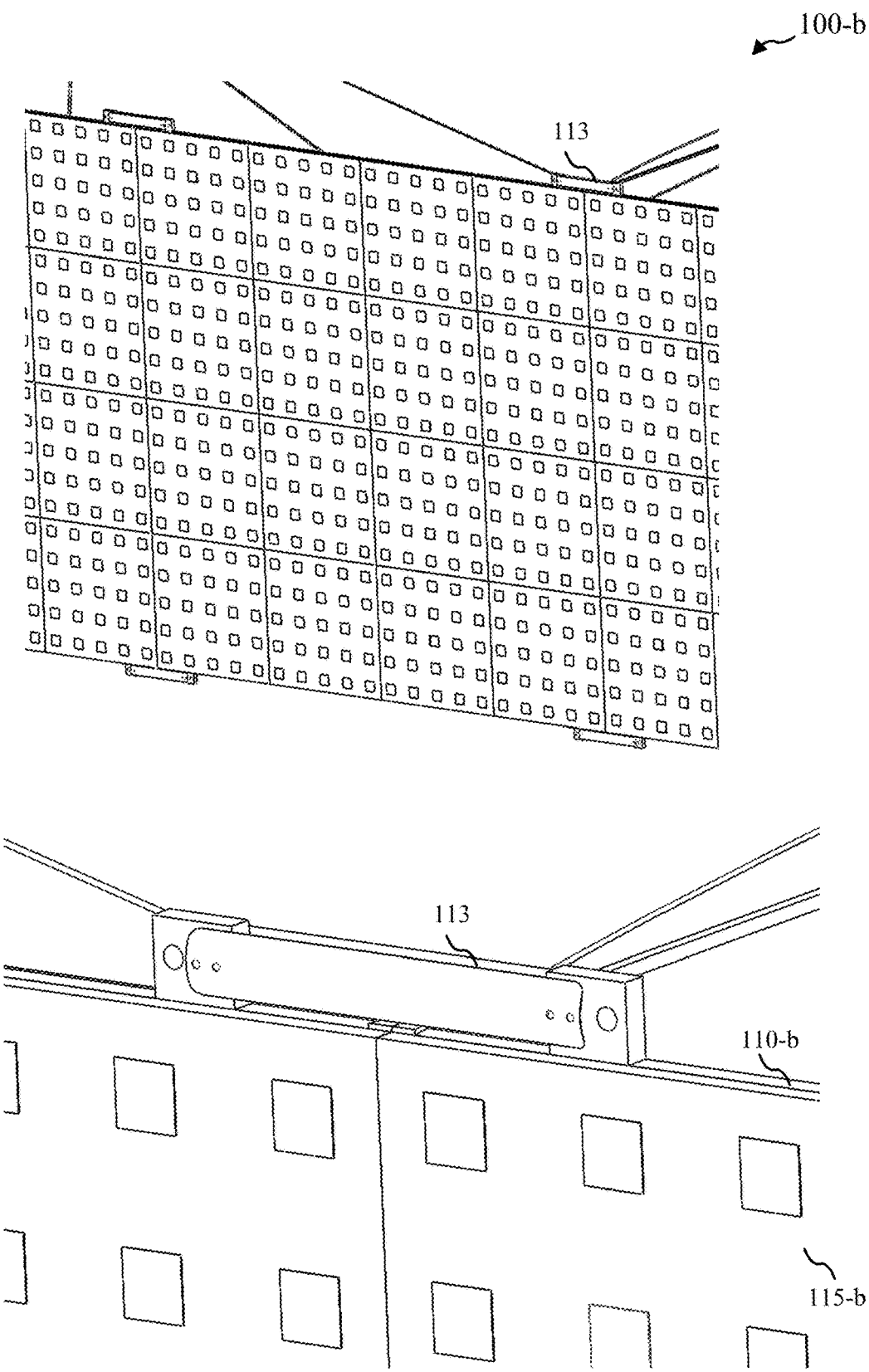
Figure 3C:
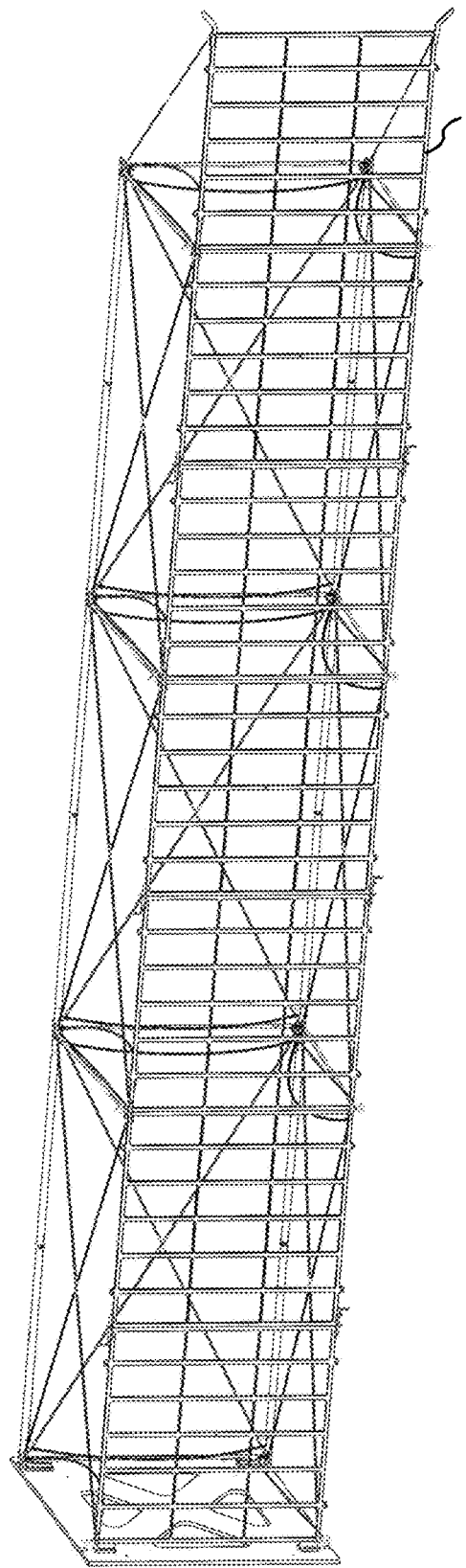

FIG. 3A and FIG. 3B show aspects of a system 100-b in accordance with various embodiments. System 100-b may be an example of aspects of systems and/or methods of FIG. 1, FIG. 2A, FIG. 2B, FIG. 3C, FIG. 4A, FIG. 4B, FIG. 4C, FIG. 4D, FIG. 4E, FIG. 4F, FIG. 5, FIG. 6, FIG. 7, FIG. 8, FIG. 9A, FIG. 9B, FIG. 10A, FIG. 10B, FIG. 10C, FIG. 10D, FIG. 10E, FIG. 11A, FIG. 11B, FIG. 11C, FIG. 12, FIG. 13A, FIG. 13B, and/or FIG. 14. System 100-b may include multiple frames, including frame 110-b called out, that may form as a frame array, an element frame array, or panel frame array with the various components shown. The frame array may provide a continuous structure. This example may include 9 to 15 frames, including frame 110-b, though other embodiments can include more or fewer frames 110-b. Each frame 110-b may be coupled with one or more elements, such as element 115-b, which may include RF or photovoltaic elements. In this example, 9 elements may be coupled with each frame, though other embodiments can include more or fewer elements per frame. As may be highlighted in FIG. 3B, each frame 110-b may be structurally connected to the next frame with a variety of components, such as high strain composite (HSC) tape springs 113 or other hinge components, though other materials and components may be utilized. This structure may provide for simple, high dimensional repeatability, and/or high on-orbit dimensional stability. FIG. 3B also generally shows a larger scale view of the integrated frames, including frame 110-b. Other components may be shown, though not called out, such as additional frames, additional elements, offset buckled batten(s), diagonal(s), and/or longeron(s). FIG. 3C show aspects of a system 100-b-1 in accordance with various embodiments. System 100-b-1 may be an example of aspects of systems and/or methods of FIG. 1, FIG. 2A, FIG. 2B, FIG. 3A, FIG. 3B, FIG. 4A, FIG. 4B, FIG. 4C, FIG. 4D, FIG. 4E, FIG. 4F, FIG. 5, FIG. 6, FIG. 7, FIG. 8, FIG. 9A, FIG. 9B, FIG. 10A, FIG. 10B, FIG. 10C, FIG. 10D, FIG. 10E, FIG. 11A, FIG. 11B, FIG. 11C, FIG. 12, FIG. 13A, FIG. 13B, and/or FIG. 14. System 100-b-1 may include multiple frames, such as frame 110-b-1, that may form as an element frame array with the various components shown transparent. The frame array may provide a continuous structure. This example may include 7 frames, including frame 110-b-1, though other embodiments can include more or fewer frames, such as frame 110-b-1. Each frame 110-b-1 may be coupled with one or more elements (not shown), such as RF or photovoltaic elements.

Figure 4A:
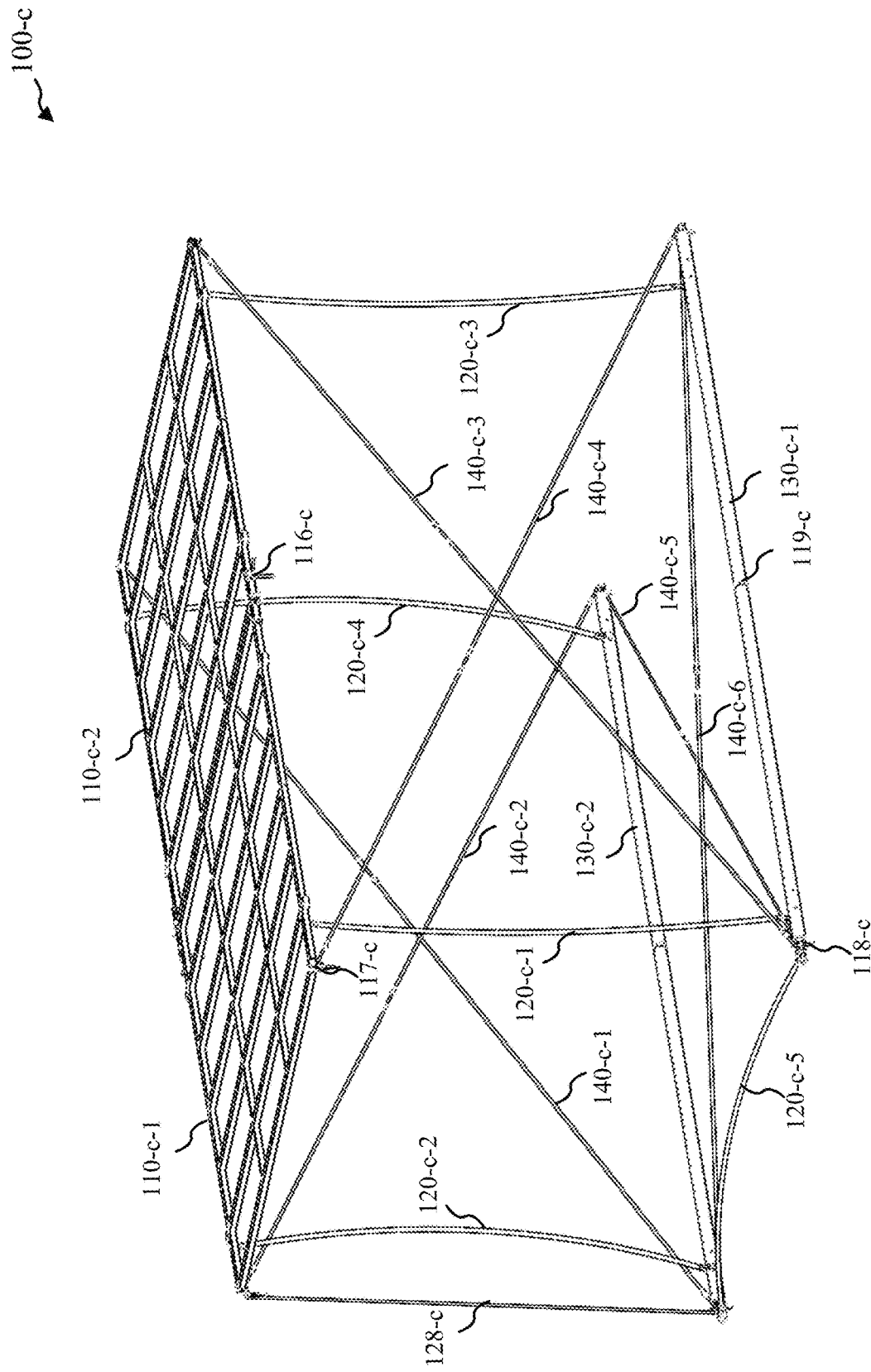
FIG. 4A, FIG. 4B, FIG. 4C, FIG. 4D, FIG. 4E, and FIG. 4F show aspects of systems in accordance with various embodiments.

FIG. 4A shows aspects of a system 100-c in accordance with various embodiments. System 100-c may be an example of aspects of systems and/or methods of FIG. 1, FIG. 2A, FIG. 2B, FIG. 3A, FIG. 3B, FIG. 3C, FIG. 4B, FIG. 4C, FIG. 4D, FIG. 4E, FIG. 4F, FIG. 5, FIG. 6, FIG. 7, FIG. 8, FIG. 9A, FIG. 9B, FIG. 10A, FIG. 10B, FIG. 10C, FIG. 10D, FIG. 10E, FIG. 11A, FIG. 11B, FIG. 11C, FIG. 12, FIG. 13A, FIG. 13B, and/or FIG. 14. System 100-c generally highlights the components of an individual bay. System 100-c may include offset buckled battens 120-c-1, 120-c-2, 120-c-3, and 120-c-4, longerons 130-c-1 and 130-c-2, and/or diagonals 140-c-1, 140-c-2, 140-c-3, 140-c-4, 140-c-5, and 140-c-6. The longerons 130-c may be referred to as longeron assemblies and may include a hinged portion, such as a mechanical hinge or dog bone hinge. System 100-c may include a frames 110-c-1 and 110-c-2. Center hinges 116-c and/or truss hinges 117-c may couple frames with each other and allow for frames 110-c to fold up for stowage.

System 100-c may include one or more truss hinges 117-c that may form a truss hinge assembly, which may connect the frames at the bay-to-bay locations. These hinges may form "mountain" folds of the accordion-folded frames. The truss hinges 117-c are generally located at the ends of each bay and may be bonded/fastened to the longitudinal box beams running in the longitudinal direction of the frames.

With respect to the truss hinges 117-c, preload may be established across cup/cone interfaces, in some embodiments, between frames near the truss hinges 117-c by the action of tensioned diagonals 140-c within the faces of the truss. The lengths of these diagonals 140-c may be set precisely to ensure straightness and alignment of the frames after deployment. The truss hinge 117-c may incorporate a flexure or spring components (a strain energy component in general) that may help ensure consistent preload of the cup/cone interface in the deployed configuration. The flexure or spring incorporated into the truss hinge 117-c may enable a relatively large range of hinge rotation so that the cup/cone preload involved to maintain structural stiffness and stability may be maintained, even in off-nominal conditions. FIG. 4C provides more details regarding the one or more truss hinges 117-c of FIG. 4A and/or FIG. 4B. For example, FIG. 4C shows aspects of a system 100-c-2 in a stowed state (upper portion) and a deployed state (lower portion). FIG. 4C generally highlights a truss hinge 117-c-2 that may rotate around a pivot point 111 that is offset opposite from an outer face 112-c-1 of a first frame 110-c-1 from the multiple frames and from an outer face 112-c-2 of a second frame 110-c-2 from the multiple frames such that the first frame 110-c-1 and the second frame 110-c-2 make contact between a cup 121 coupled with the first frame 110-c-1 and a cone 122 coupled with the second 110-c-2 frame at an end of deployment and a strain energy component, such as spring 123, preloads an interface 124 between the cup 121 and the cone 122. In general, element 123 may be other strain energy component such as a flexure.

Center hinges 116-c, which may form "valley" folds of the accordion-folded frames, generally connect the two frames 110-c-1 and 110-c-2 that may form a single bay. These hinges may include a pin-clevis mechanism in some embodiments that may provide the appropriate pivot point to allow the frames to deploy, and then may rotate laterally to move the pivot portion of the mechanism below the radiating plane of the aperture. This rotation may be actuated using a simple torsion spring, for example. FIG. 4D provides more details regarding the one or more center hinges 116-c of FIG. 4A and/or FIG. 4B. For example, FIG. 4D shows aspects of a system 100-c-3 in a stowed state (upper portion) and a deployed state (lower portion). FIG. 4D generally highlights a center hinge 116-c-3 that includes a first hinge axis 125 that rotates around a pivot point 111-c that is offset neighboring to an outer face 112-c-3 of a first frame 110-c-3 of the multiple frames and an outer face 112-c-4 of a second frame 110-c-4 of the multiple frames and a second hinge axis 126 that rotates the first hinge axis 125 away from the outer face 112-c-3 of the first frame 110-c-3 and the outer face 112-c-4 of the second frame 110-c-4 as the first frame 110-c-3 and the second frame 110-c-4 deploy. Spring 123-c may facilitate the rotation of the first hinge axis 125. Through rotating in this way, the center hinge 116-c-2 may avoid interfering with RF elements.

System 100-c shows the orientation of an axis of a hinge 119-c coupled with longeron 130-c-1 with respect to an axis of a hinge 116-c coupled with two or more frames 110-c-1, 110-c-2. For example, a hinge axis 119-c coupled with longeron 130-c-1 may be substantially parallel to a hinge axis 116-c coupled with two or more frames 110-c-1 and 110-c-2.

The vertical buckled battens 120-c may have two functions within the system. First, they may provide the majority of the strain energy needed for deployment of the system. Second, they may provide the force to tension the diagonals 140-c and pre-load the deployed system. Regarding this second function, the battens 120-c may be designed to generate a known force output. The battens 120-c may be constructed from CFRP materials with two bonded metallic end fittings. Battens 120-c provide examples where each batten is coupled with at least one longeron 130-c from the multiple longerons and one or more frames 110-c from the multiple frames such that the respective batten 120-c is offset along a length of the respective longeron 130-c with respect to at least a hinge point (such as at hinge 118-c) between the respective longeron and another longeron from the multiple longerons or a hinge point (such as at hinge 117-c) between two or more of frames 110-c from the multiple frames.

Some embodiments include additional buckled battens, such as buckled batten 120-c-5. Buckled batten 120-c-5 may be coupled with longeron 130-c-1 and longeron 130-c-2 such that buckled batten 120-c-5 is aligned with a hinge point (such as with respect to longeron hinge 118-c) between longeron 130-c-1 and the other longeron (not shown; would generally extend to the left of longeron 130-c-1) from the multiple longerons or a hinge point between longeron 130-c-2 and another longeron (not shown; would generally extend to left of longeron 130-c-2). In some embodiments, a guide batten 128-c may be configured such that it is in compression during deployment and uncompressed at full deployment. For example, guide batten 128-*c* may be aligned with at least the hinge point (such as with respect to hinge 118-*c*) between the respective longeron and the other longeron from the multiple longerons 130-*c* or the hinge point (such as with respect to hinge 117-*c*) between the respective frame and the other frame from the multiple frames 110-*c* such that guide batten 128-*c* is in compression during deployment and uncompressed or out of compression at full deployment.

Tensioned diagonals 140-*c* may be installed on the sides as well as the bottom of each truss bay and may provide high stiffness in bending and torsion. Since these elements are generally folded within the truss for stowage, they generally contain flexible sections. In some embodiments, to make their stowage repeatable and well controlled, as well as to minimize snag hazards, these elements may include rigid segments connected by a flexible cable located only in the fold regions. In general, side tensioned diagonals 140-*c*-1 and 140-*c*-2 may be tensioned by buckled battens 120-*c*-2 and 120-*c*-4. Side tensioned diagonals 140-*c*-3 and 140-*c*-4 may be tensioned by buckled battens 120-*c*-1 and 120-*c*-3. Bottom tensioned diagonals 140-*c*-5 and 140-*c*-6 may be tensioned by buckled batten 120-*c*-5.

Figure 4B:
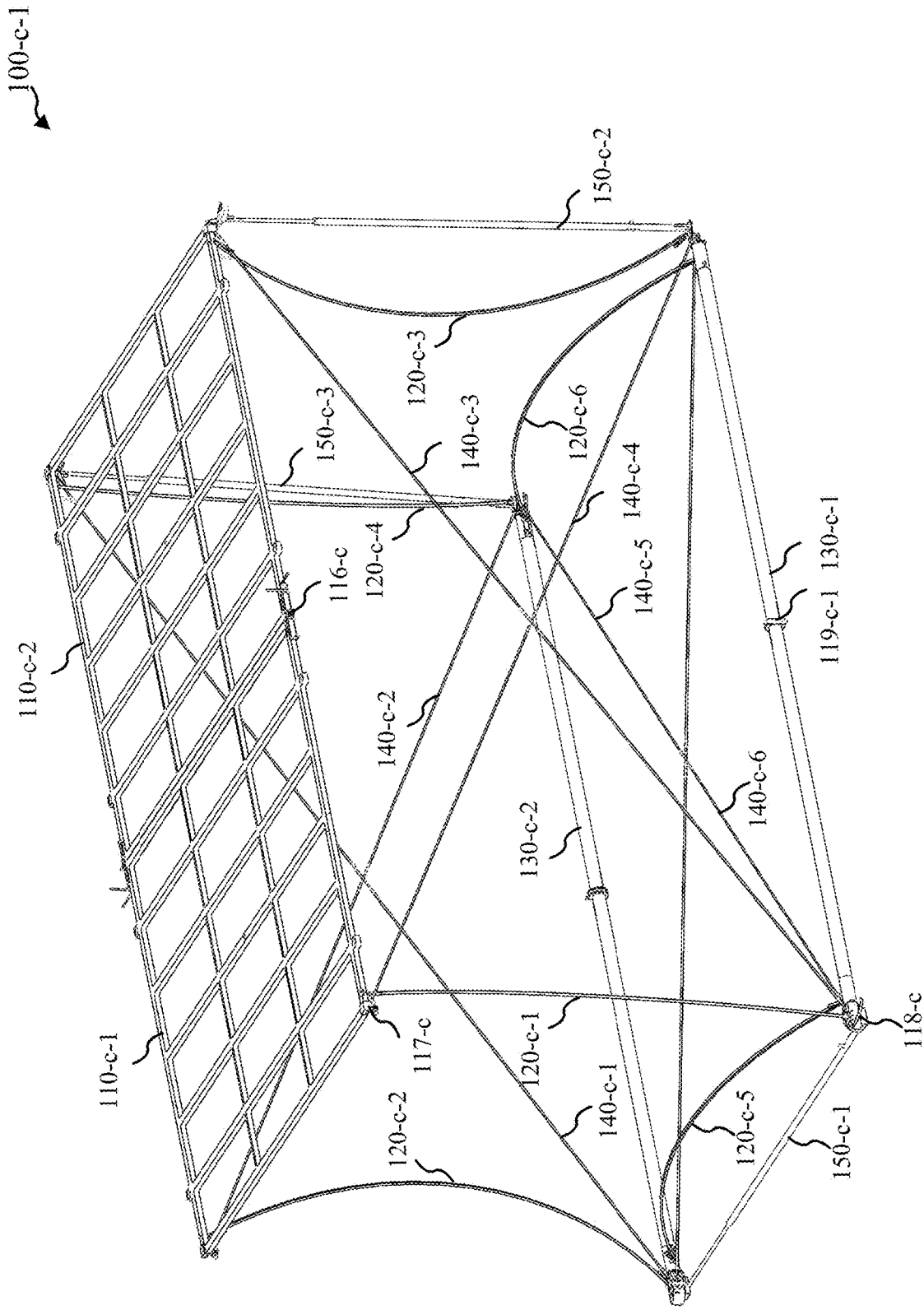
Figure 4C:
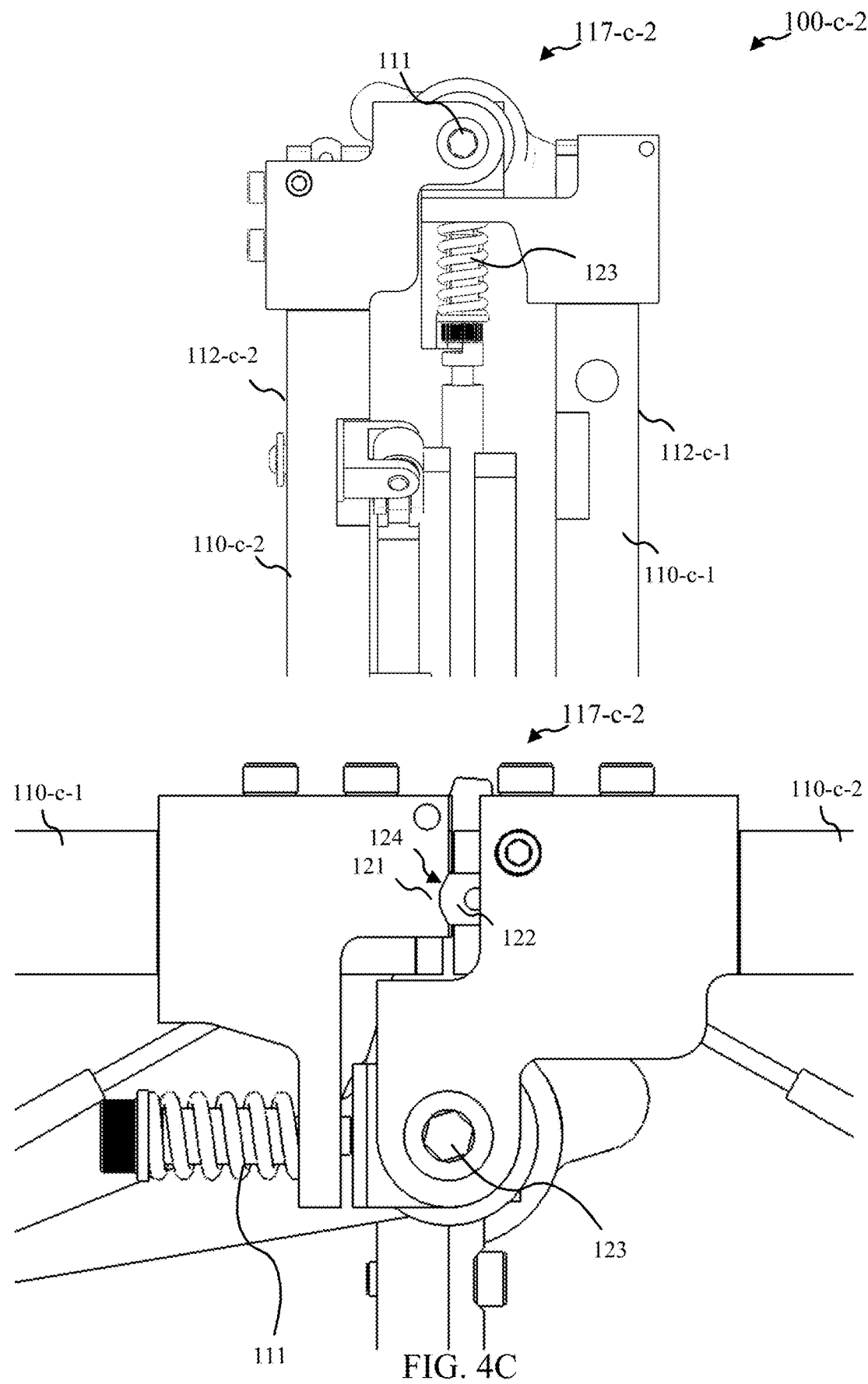
Figure 4D:
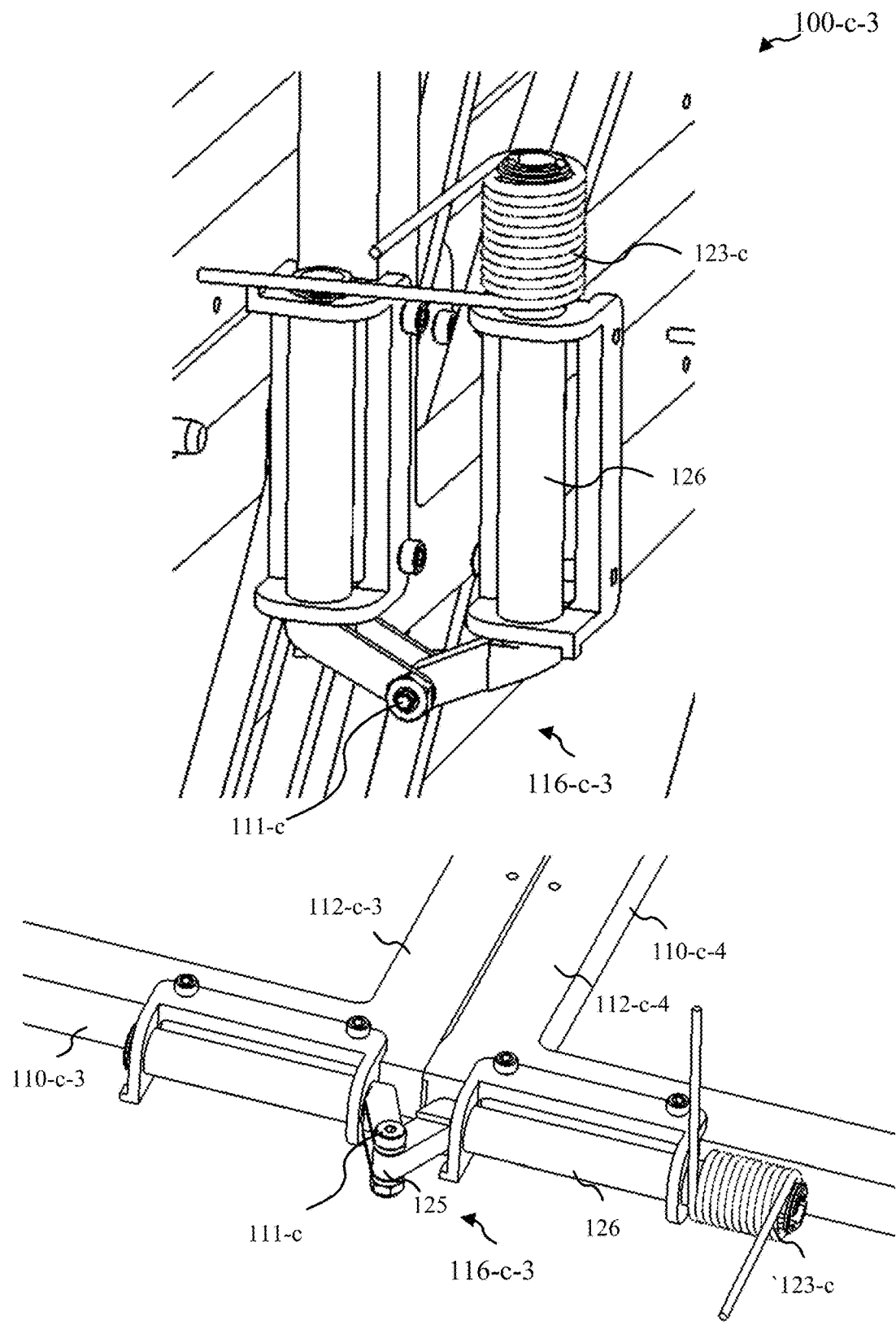

FIG. 4B shows aspects of a system 100-*c*-1 in accordance with various embodiments. System 100-*c*-1 may be an example of aspects of systems and/or methods of FIG. 1, FIG. 2A, FIG. 2B, FIG. 3A, FIG. 3B, FIG. 3C, FIG. 4A, FIG. 4C, FIG. 4D, FIG. 4E, FIG. 4F, FIG. 5, FIG. 6, FIG. 7, FIG. 8, FIG. 9A, FIG. 9B, FIG. 10A, FIG. 10B, FIG. 10C, FIG. 10D, FIG. 10E, FIG. 11A, FIG. 11B, FIG. 11C, FIG. 12, FIG. 13A, FIG. 13B, and/or FIG. 14. System 100-*c*-1 generally highlights the components of an individual bay. System 100-*c*-1 generally includes the same elements of system 100-*c* of FIG. 4A, with some variations in configuration and/or components. System 100-*c*-1 may include offset buckled battens 120-*c*-1, 120-*c*-2, 120-*c*-3, 120-*c*-4, 120-*c*-5, and/or 120-*c*-6, longerons 130-*c*-1 and 130-*c*-2, and/or diagonals 140-*c*-1, 140-*c*-2, 140-*c*-3, 140-*c*-4, 140-*c*-5, and 140-*c*-6. The longerons 130-*c* may be referred to as longeron assemblies and may include a hinged portion, such as a mechanical hinge or dog bone hinge. System 100-*c* may include frames 110-*c*-1 and 110-*c*-2. Center hinges 116-*c* and/or truss hinges 117-*c* may couple frames with each other and allow for frames 110-*c* to fold up for stowage. FIG. 4B shows an example of an individual bay.

Buckled battens 120-*c*-1, 120-*c*-2, 120-*c*-3, and 120-*c*-4 provide examples where each batten is coupled with at least one longeron 130-*c* from the multiple longerons and one or more frames 110-*c* from the multiple frames such that the respective batten is offset with respect to a hinge point (such as at truss hinge 117-*c*) between two or more of frames 110-*c* from the multiple frames. Battens 120-*c*-1, 120-*c*-2, 120-*c*-3, and 120-*c*-4 may be coupled with longeron 130-*c*-1 or 130-*c*-2 such that they are aligned with a hinge point (such as at longeron hinge 118-*c*). Battens 120-*c*-5 and 120-*c*-6 provide examples where each buckled batten is coupled with longeron 130-*c*-1 and longeron 130-*c*-2 such that buckled batten 120-*c*-5 may be offset with respect to a hinge point (such as with respect to longeron hinge 118-*c*) of longeron 130-*c*-1 and a hinge point of the longeron 130-*c*-2 such that buckled batten 120-*c*-5 is in compression during deployment. Buckled batten 120-*c*-6 may be similarly offset with respect to longerons 130-*c*-1 and 130-*c*-2 with respect to hinge points on the opposite sides of longerons 130-*c*-1 and 130-*c*-2. In general, side tensioned diagonals 140-*c*-1 and 140-*c*-2 may be tensioned by buckled battens 120-*c*-2 and 120-*c*-4. Side tensioned diagonals 140-*c*-3 and 140-*c*-4 may be tensioned by buckled battens 120-*c*-1 and 120-*c*-3. Bottom tensioned diagonals 140-*c*-5 and 140-*c*-6 may be tensioned by buckled batten 120-*c*-5.

System 100-*c*-1 shows the orientation of an axis of a hinge 119-*c*-1 coupled with longeron 130-*c*-1 with respect to an axis of a hinge 116-*c* coupled with two or more frames 110-*c*-1, 110-*c*-2. For example, the hinge axis of hinge 119-*c*-1 coupled with longeron 130-*c*-1 may be substantially perpendicular to the hinge axis 116-*c* coupled with two or more frames 110-*c*-1 and 110-*c*-2.

System 100-*c*-1 may include one or more warping restraints, such as warping restraint components 150-*c*-1, 150-*c*-2, and 150-*c*-3 (which may be referred to as articulating members) that may interface with one or more of the frames from the multiple frames 110-*c*, one or more of the longerons from the multiple longerons 130-*c*, and one or more of the battens from the multiple battens 120-*c* such that a kinematic motion of the system 100-*c*-1 is restricted and a synchronous deployment of the system 100-*c*-1 is ensured. The one or more warping restraints, such as warping restraints components 150-*c*-1, 150-*c*-2, and 150-*c*-3 may form a planar assembly of articulating members that have freedom to at least extend in length while being resistant to at least lateral bending or torsional deformation such that the planar assembly of articulating members are configured to at least expand or distort in a plane of the articulating members and are restricted from warping out of the plane of the articulating members. The articulating members may include telescoping members. In general, the warping restraints 150-*c* are semi-rigid planar structures aligned generally perpendicular to the common plane of the deployed frames 110-*c* and free to move during deployment without inducing significant parasitic drag or friction to the remainder of the system but interconnected with the other elements of the system so as to restrict the kinematic motion of the system and ensure synchronous deployment of the system.

Figure 4E:
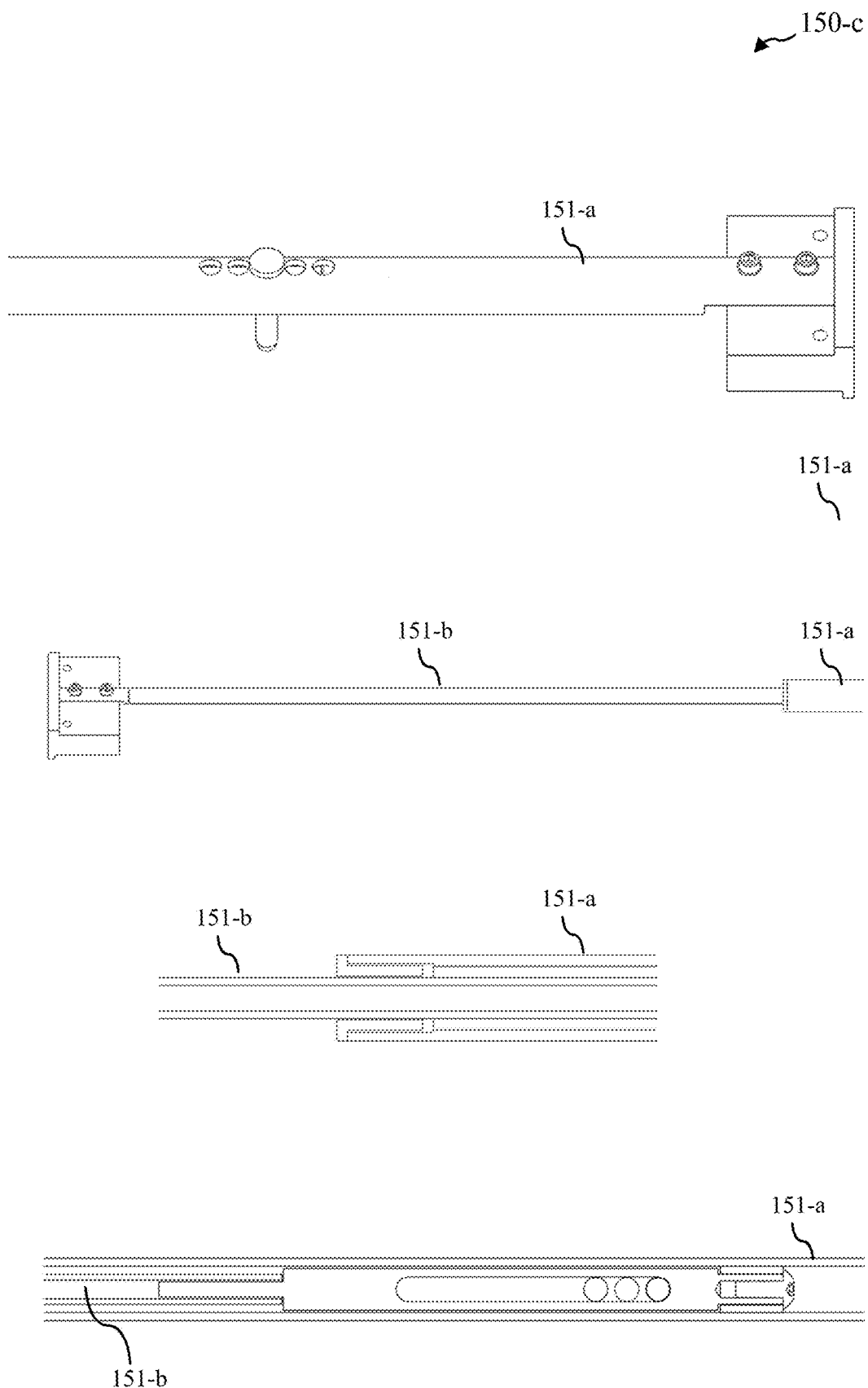
Figure 4F:
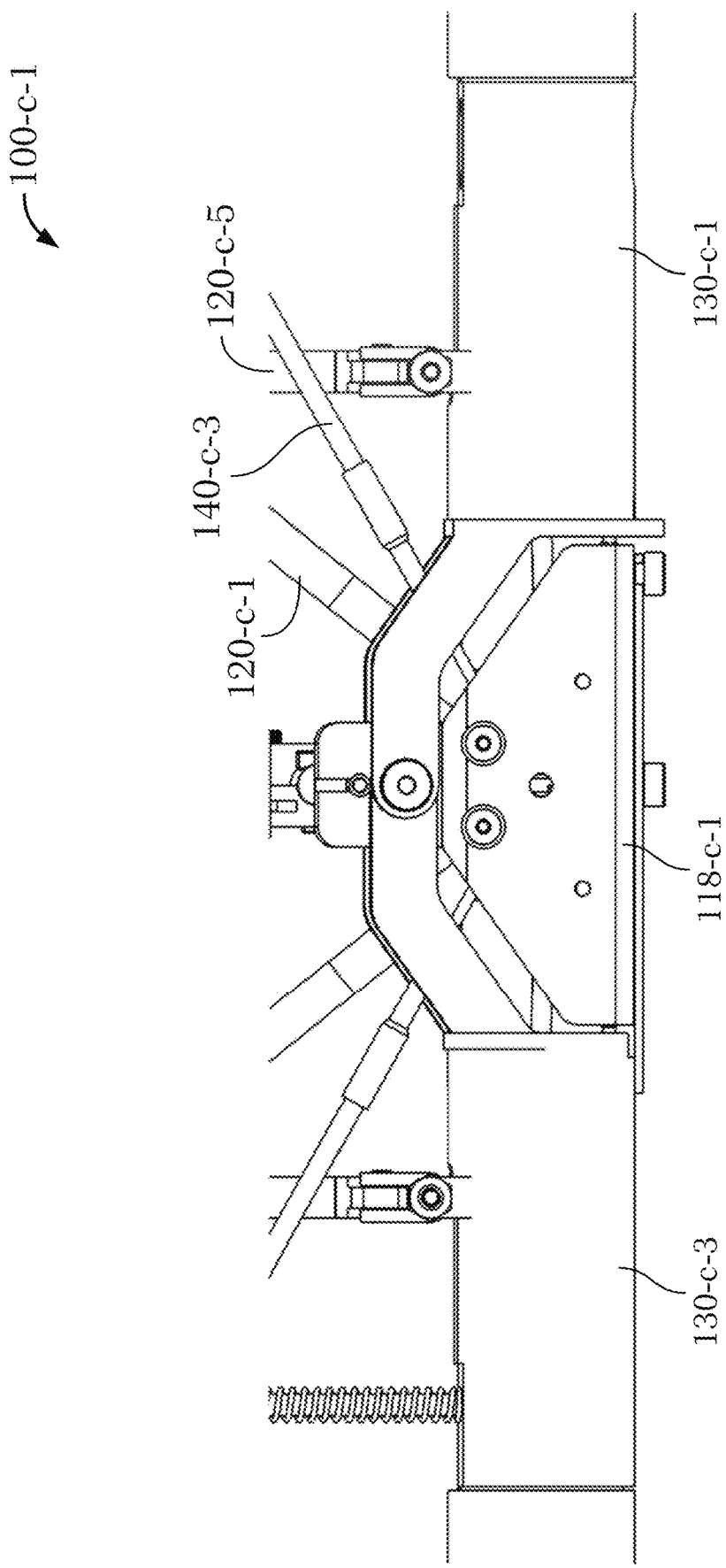

Specific aspects of FIG. 4B are also highlighted in FIG. 4E and FIG. 4F. For example, FIG. 4E highlights aspects of warping restraint components 150-*c* (e.g., articulating members) in accordance with various embodiments, which may be examples of warping restraint components 150-*c*-1 and 150-*c*-2 of FIG. 4B. These generally show the articulating members as telescoping members that include multiple articulating elements, such as telescoping elements 151-*a*/151-*b*. The articulating member 150-*e* (with telescoping elements 151-*a* and 151-*b* for example) generally form semi-rigid planar structures aligned perpendicular to the common plane of the deployed frames and may be free to move during deployment without inducing significant parasitic drag or friction to the remainder of the system but may be interconnected with the other components of the system so as to restrict the kinematic motion of the system and ensure synchronous deployment of the system.

FIG. 4F generally highlights a region around longeron hinge 118-*c*-1 (which may be an example of longeron hinge region around hinge 118 of FIG. 4B) showing in particular the offset nature of buckled batten 120-*c*-5, the alignment nature of buckled batten 120-*c*-1, longeron 130-*c*-1, and the position of tensioned diagonal 140-*c*-3. FIG. 4F also shows the other longeron 130-*c*-3 that extends to the left of longeron 130-*c*-1 in the deployed state. FIG. 4F generally highlights several features of a longeron hinge and lower deck corner assembly hardware in accordance with various embodiments. This assembly may include a joint within the truss where many elements come together. This hardware may provide the hinge interface for longeron assemblies, as well as the interface for the diagonals, lower deck battens and kinematic verticals. This assembly may be designed such that the lines of action for several structural components come to a single point.

Figure 5:
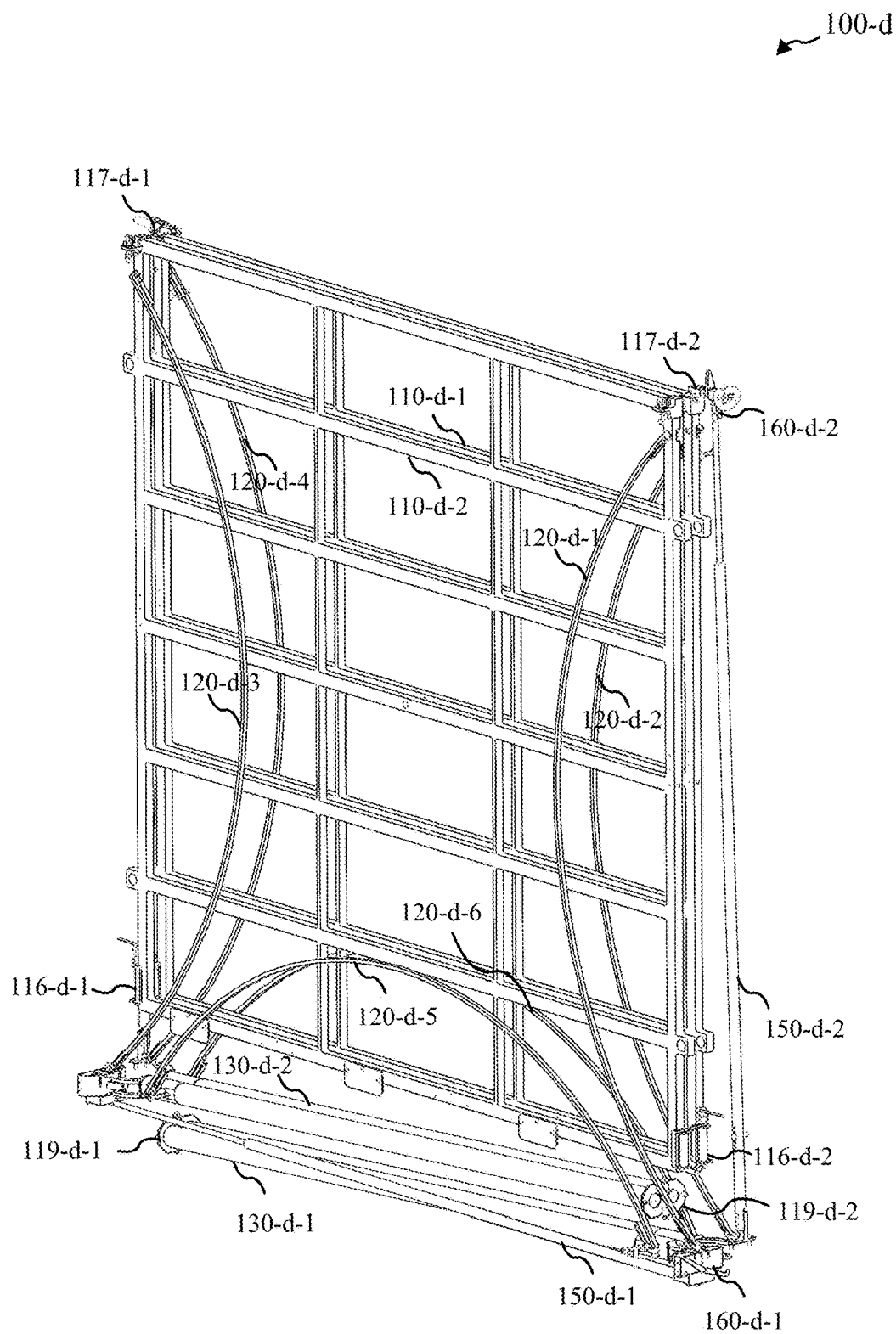
FIG. 5 shows aspects of a system in accordance with various embodiments.

FIG. 5 shows aspects of a system 100-*d* in accordance with various embodiments. System 100-*d* may be an example of aspects of systems and/or methods of FIG. 1, FIG. 2A, FIG. 2B, FIG. 3A, FIG. 3B, FIG. 3C, FIG. 4A, FIG. 4B, FIG. 4C, FIG. 4D, FIG. 4E, FIG. 4F, FIG. 6, FIG. 7, FIG. 8, FIG. 9A, FIG. 9B, FIG. 10A, FIG. 10B, FIG. 10C, FIG. 10D, FIG. 10E, FIG. 11A, FIG. 11B, FIG. 11C, FIG. 12, FIG. 13A, FIG. 13B, and/or FIG. 14. System 100-*d* may show a single bay with elements (such as RF tiles) removed so that the various components may be seen in a stowed configuration. System 100-*d* may show components such as buckled battens 120-*d*-1, 120-*d*-2, 120-*d*-3, 120-*d*-4, 120-*d*-5, and 120-*d*-6, longerons 130-*d*-1 and 130-*d*-2, frames 110-*d*-1 and 110-*d*-2, truss hinges 117-*d*-1 and 117-*d*-2, and/or center hinges 116-*d*-1 and 116-*d*-2. Longeron mechanical hinges 119-*d*-1 and 119-*d*-2 are shown as part of the longeron assemblies. The orientation of an axis of a hinge 119-*d*-1 coupled with longeron 130-*d*-1 is generally shown with respect to an axis of a hinge 117-*d*-1 (or hinge 116-*d*-1) coupled with two or more frames 110-*d*-1, 110-*d*-2. For example, a hinge axis 119-*d*-1 coupled with longeron 130-*d*-1 may be substantially perpendicular to a hinge axis 117-*d*-1 (or 116-*d*-1) coupled with two or more frames 110-*d*-1 and 110-*d*-2. Similarly, a hinge axis 119-*d*-2 coupled with longeron 130-*d*-2 may be substantially perpendicular to a hinge axis 117-*d*-2 (or 116-*d*-2) coupled with two or more frames 110-*d*-1 and 110-*d*-2. In additional, aspects of a longeron sequencer 160-*d*-1 and frame sequencer 160-*d*-2 are shown. Warping restraints components 150-*d*-1 and 150-*d*-2 are also shown. FIG. 5 in particular may provide an example of system 100-*c*-1 of FIG. 4B in a stowed state. System 100-*d* may include multiple diagonals (not shown).

Figure 6:
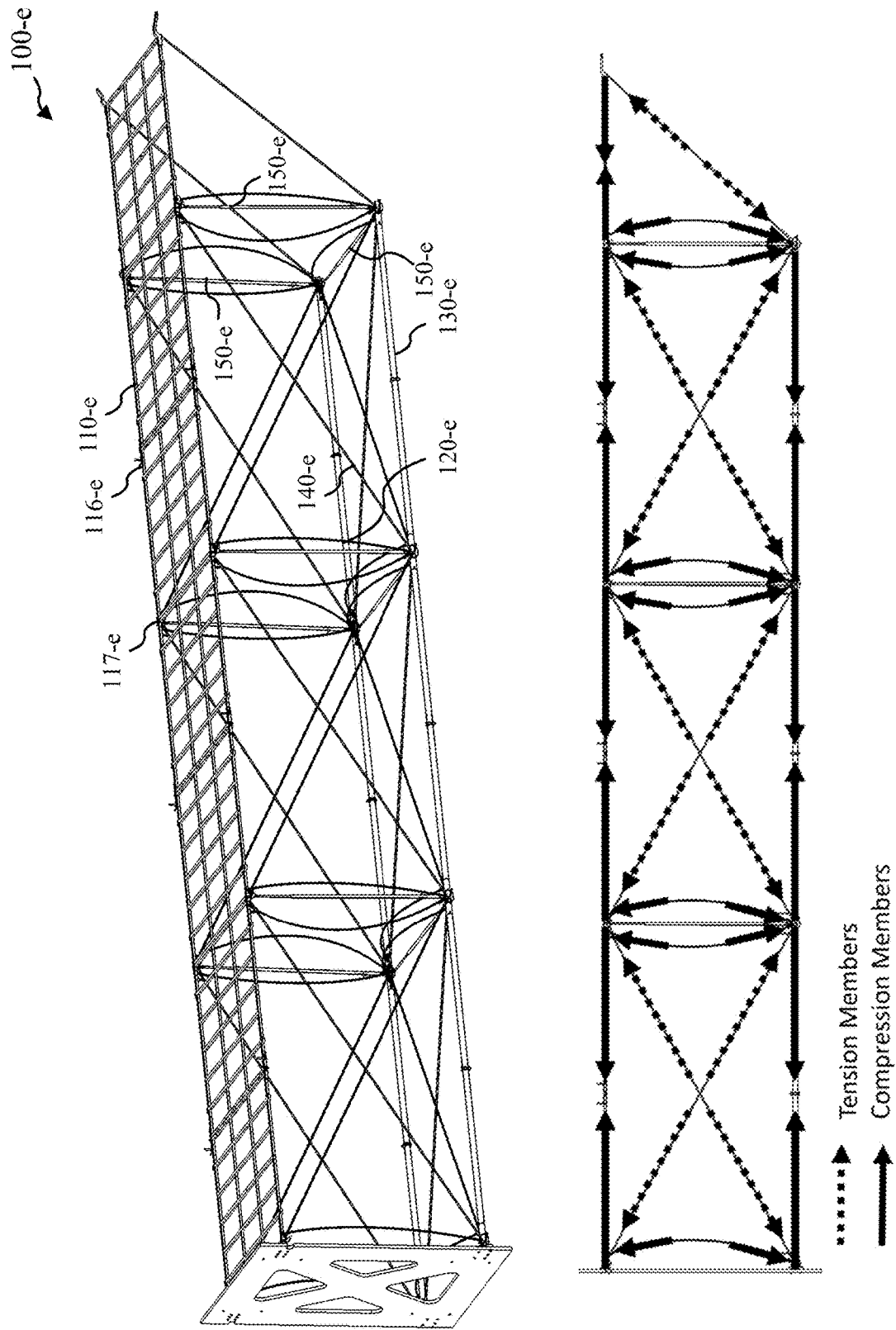
FIG. 6 shows aspects of a system in accordance with various embodiments.

FIG. 6 shows aspects of a system 100-*e* in accordance with various embodiments. System 100-*e* may be an example of aspects of systems and/or methods of FIG. 1, FIG. 2A, FIG. 2B, FIG. 3A, FIG. 3B, FIG. 3C, FIG. 4A, FIG. 4B, FIG. 4C, FIG. 4D, FIG. 4E, FIG. 4F, FIG. 5, FIG. 7, FIG. 8, FIG. 9A, FIG. 9B, FIG. 10A, FIG. 10B, FIG. 10C, FIG. 10D, FIG. 10E, FIG. 11A, FIG. 11B, FIG. 11C, FIG. 12, FIG. 13A, FIG. 13B, and/or FIG. 14. System 100-*e* may show in particular a multi-bay system based on individual bays, such as those shown in FIG. 4B, for example, though the general layout of this multi-bay system may cover other configurations. FIG. 6 may show various load paths within the system, including components or members that are tensioned and those that are in compression. Various exemplar components are called out such as frame 110-*e*, center hinge 116-*e*, truss hinge 117-*e*, offset buckled batten 120-*e*, longeron 130-*e*, diagonal 140-*e*, and/or warping restraints 150-*e*.

Figure 7:
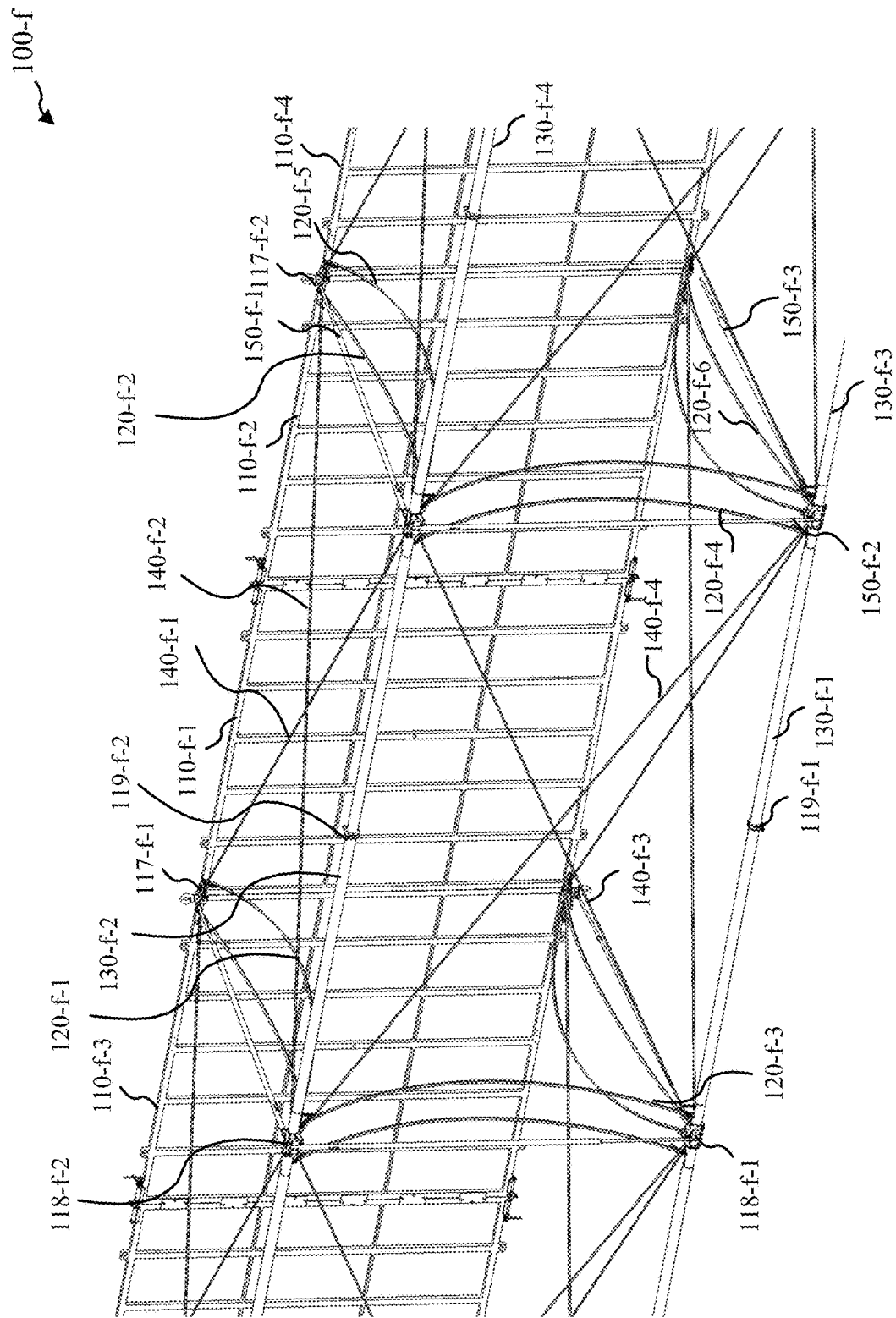
FIG. 7 shows aspects of a system in accordance with various embodiments.

FIG. 7 shows aspects of a system 100-*f* in accordance with various embodiments. System 100-*f* may be an example of aspects of systems and/or methods of FIG. 1, FIG. 2A, FIG. 2B, FIG. 3A, FIG. 3B, FIG. 3C, FIG. 4A, FIG. 4B, FIG. 4C, FIG. 4D, FIG. 4E, FIG. 4F, FIG. 5, FIG. 6, FIG. 8, FIG. 9A, FIG. 9B, FIG. 10A, FIG. 10B, FIG. 10C, FIG. 10D, FIG. 10E, FIG. 11A, FIG. 11B, FIG. 11C, FIG. 12, FIG. 13A, FIG. 13B, and/or FIG. 14. FIG. 7 may highlight various aspects of a backing structure in accordance with various embodiments. System 100-*f* may reflect a multi-bay system based on individual bays, such as that shown in FIG. 4B. The backing structure may be referred to as a folding truss. The front face of the truss may include a frame array including multiple frames (two frames of a bay are specifically called out as frames 110-*f*-1 and 110-*f*-2). One or more longerons 130-*f* may run along the backside of the truss; longerons 130-*f*-1 and 130-*f*-2 of a bay are called out. The longerons 130-*f* may be constructed from a variety of materials, such as carbon fiber reinforced polymer (CFRP), though other materials may be utilized. The longeron(s) 130-*f* may include a mechanical hinge or other folding mechanism, such as a dog bone hinge. Hinges 119-*f*-1 and 119-*f*-2 are specifically called out and provide examples of mechanical hinges. The orientation of an axis of a hinge 119-*f*-1 coupled with longeron 130-*f*-1 with respect to an axis of a hinge 117-*f*-2 coupled with frames 110-*f*-2 and 110-*f*-4. For example, a hinge axis 119-*f*-1 coupled with longeron 130-*f*-1 may be substantially perpendicular to a hinge axis 117-*f*-1 coupled with frames 110-*f*-1 and 110-4-3. The orientation of hinge axis 119-*f*-2 of longeron 130-*f*-2 may be similarly perpendicularly oriented with respect to the axis of hinge 117-*f*-2 (or hinge 117-*f*-1). Tensioned diagonals 140-*f* on the back and/or side faces may ensure torsional stiffness and/or dimensional repeatability; diagonals 140-*f*-1, 140-*f*-2, 140-*f*-3, and 140-*f*-4 from a bay are called out. Buckled battens 120-*f* may tension the diagonals 140-*f* and/or other components. For example, battens 120-*f*-1 and 120-*f*-2 may be configured as buckled offset side-face battens that may apply tension to side face diagonals 140-*f*-1 and 140-*f*-2. Buckled batten 120-*f*-1 may be coupled with frame 110-*f*-1 such that it is offset along a length of frame 110-*f*-1 with respect to a hinge point (such as with respect to truss hinge 117-*f*-1) between frame 110-*f*-1 and frame 110-*f*-3. Similarly, buckled battens 120-*f*-2 may be coupled with frame 110-*f*-2 such that it is offset along a length of frame 110-*f*-2 with respect to a hinge point (such as with respect to truss hinge 117-*f*-2) between frame 110-*f*-2 and frame 110-*f*-4.

Buckled battens 120-*f*-3 and 120-*f*-4 may be configured as buckled, offset back face battens that may apply tension to a back face, such as back-face diagonals 140-*f*-3 and 140-*f*-4. In these examples, buckled batten 120-*f*-3 may be coupled with longerons 130-*f*-1 and 130-*f*-2 such that buckled batten 120-*f*-3 is offset with respect to a hinge point (such as with respect to longeron hinge 118-*f*-1) of longeron 130-*f*-1 and a hinge point (such as with respect to longeron hinge 118-*f*-2) of longeron 130-*f*-2 such that longeron 130-*f*-3 is in compression during deployment. Buckled batten 120-*f*-4 may be similarly coupled with longerons 130-*f*-1 and 130-*f*-2 in an offset configuration with respect to hinge points at the ends of longerons 130-*f*-1 and 130-*f*-2.

System 100-*f* may also include one or more one or more warping restraints, which may include articulating components 150-*f*-1, 150-*f*-2, and 150-*f*-3, that interface with frames 110-*f*-2 and/or 110-*f*-4, longerons 130-*f*-1, 130-*f*-2, 130-*f*-3, and/or 130-*f*-4, and/or battens 120-*f*-2, 120-*f*-4, 120-*f*-5, and/or 120-*f*-6 such that a kinematic motion of the system is restricted and a synchronous deployment of the system is ensured. Articulating members 150-*f*-1, 150-*f*-2, and 150-*f*-3 may form a planar assembly that has freedom to at least extend in length while being resistant to at least lateral bending or torsional deformation such that the planar assembly of articulating members are configured to at least expand or distort in a plane of the articulating members and are restricted from warping out of the plane of the articulating members.

Figure 8:
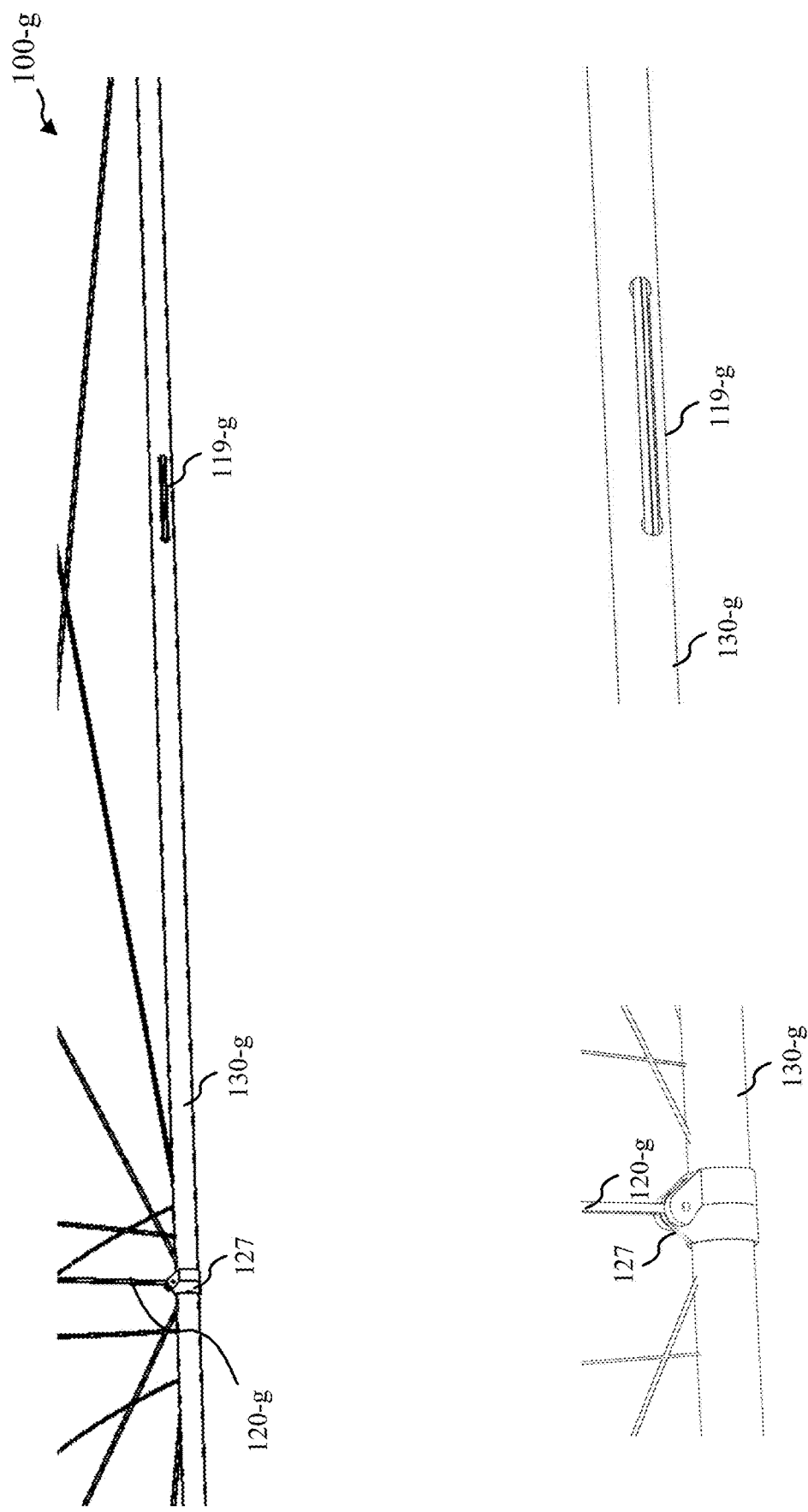
FIG. 8 shows aspects of a system in accordance with various embodiments.

FIG. 8 shows aspects of a system 100-*g* in accordance with various embodiments. System 100-*g* may be an example of aspects of systems and/or methods of FIG. 1, FIG. 2A, FIG. 2B, FIG. 3A, FIG. 3B, FIG. 3C, FIG. 4A, FIG. 4B, FIG. 4C, FIG. 4D, FIG. 4E, FIG. 4F, FIG. 5, FIG. 6, FIG. 7, FIG. 9A, FIG. 9B, FIG. 10A, FIG. 10B, FIG. 10C, FIG. 10D, FIG. 10E, FIG. 11A, FIG. 11B, FIG. 11C, FIG. 12, FIG. 13A, FIG. 13B, and/or FIG. 14. In particular, system 100-g may provide an example of aspects of system 100-c of FIG. 4A. System 100-g may highlight aspects of various longeron(s) construction. For example, the longeron(s) 130-g may be configured as folding longeron tubes. The folding longeron(s) 130-g may include a hinge region, such as a dog-bone hinge 119-g that may be an integral part of the tubular structure; some embodiments utilize other hinge configurations. The longeron(s) 130-g may be formed from high strain composite materials, for example, though other materials may be utilized. At the offset buckled batten 120-g location, a hinge 127 may be included (such as a pin-clevis hinge) with a hard stop that may be preloaded at the end of deployment to enforce alignment.

Longeron 130-g may be referred to as a longeron assembly and may make up the bottom-most structural members of the system 100-g or the lower deck of the truss system. The longeron(s) 130-g may be folded for the stowage of the truss but may deploy to provide high stiffness and stability. The overall longeron (running the entire length of the truss) may include several longeron assemblies. A longeron assembly may run the length of a single bay. Each longeron assembly may be terminated with a metallic end fitting that may allow the longeron assemblies to be assembled via conventional pin-clevis hinges. At the center of the longeron 130-g, a flexible composite hinge may be used to enable the longeron to be folded for stowage. In some embodiments, the majority of the element is constructed from CFRP tubes having high stiffness. These two tubes may be bonded to a dog-bone hinge section to form the longeron assembly. The dog-bone cutout in the tube wall may allow the longeron 130-g to be folded at that location much like a tape-spring hinge.

The dog-bone hinge segments 119-g may be fabricated from High Strain Composite (HSC) materials. They are generally fully cured, high temperature, highly stable and low outgassing. However, they may be designed to sustain a sufficient strain level to allow them to be folded.

Figure 9A:
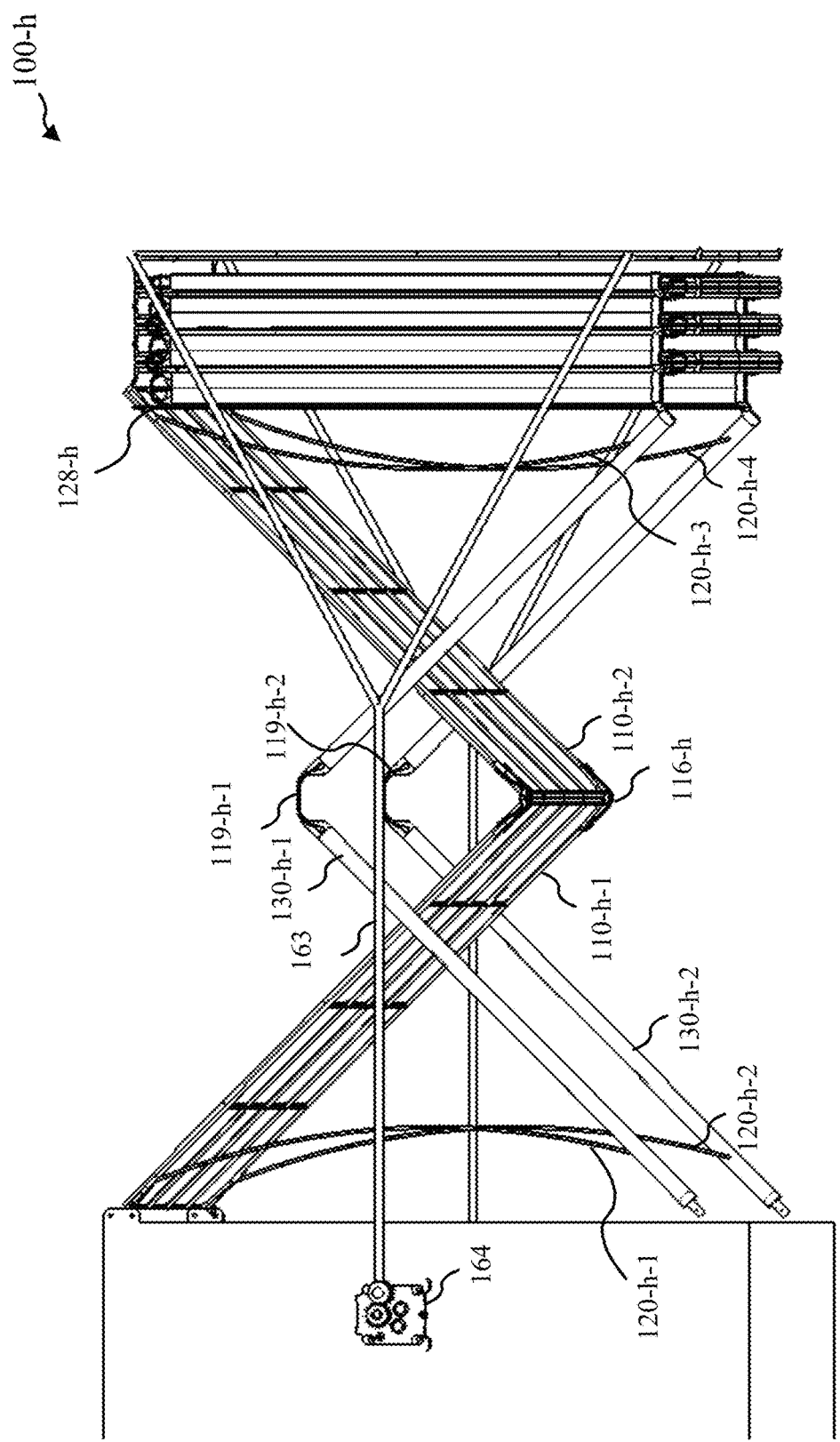
FIG. 9A and FIG. 9B show aspects of systems in accordance with various embodiments.

FIG. 9A shows aspects of a system 100-h in accordance with various embodiments. System 100-h may be an example of aspects of systems and/or methods of FIG. 1, FIG. 2A, FIG. 2B, FIG. 3A, FIG. 3B, FIG. 3C, FIG. 4A, FIG. 4B, FIG. 4C, FIG. 4D, FIG. 4E, FIG. 4F, FIG. 5, FIG. 6, FIG. 7, FIG. 8, FIG. 9B, FIG. 10A, FIG. 10B, FIG. 10C, FIG. 10D, FIG. 10E, FIG. 11A, FIG. 11B, FIG. 11C, FIG. 12, FIG. 13A, FIG. 13B, and/or FIG. 14. System 100-h may be shown in a stage of deployment that may emphasize deployment control. Stored strain energy distributed throughout the structure may provide deployment torque. For example, torque may be imparted by the buckled battens 120-h-1, 120-h-2, 120-h-3, and/or 120-h-4; the folding longeron(s) 130-h-1 and/or 130-h-2 and/or frame hinges may also impart torque, though this may be to a lesser degree than the battens 120-h. The connection point of each buckled batten 120-h to a respective longeron 130-h may be an offset distance, which may help create a torque that may be highly tailorable. In some embodiments, the buckled battens 120-h start buckled in the stowed state and may partially straighten during deployment, which may impart a large deployment torque around the hinge line. Some embodiments include one or more deployment tether(s) 163 that may control the deployment rate, which may be dictated by a drive motor 164. Some embodiments include one or more deployment guide battens 128-h that may drop out of load path when deployed. For example, guide batten 128-h may be configured such that it is in compression during deployment and uncompressed at full deployment. Guide batten 128-h may be aligned with at least the hinge point between the respective longeron 130-h-1 and the other longeron 130-h-2 from the multiple longerons or the hinge point between the respective frame 110-h-1 and the other frame 110-h-2 from the multiple frames such that guide batten 128-h is in compression during deployment and uncompressed or out of compression at full deployment. Some embodiments include one or more escapement or sequencing mechanisms (see FIG. 10, for example) that may allow each bay of the system 100-h to extend only after the previous bay is fully deployed and rigid.

In some embodiments, the deployment rate control assembly include four Kevlar straps that are reeled off of a motor driven spool. Straps may be used and co-wound on the same spool so they do not foul as a group of lanyards would (like a fouled fishing reel). Two of the straps may be routed from the reel to grommets integral to the longeron-to-bus attachment brackets. From the longeron-to-bus brackets, the straps may be routed through grommets on each lower deck corner fitting and are attached to the tip-most tray of the truss. The two remaining straps may run from the reel to grommets on each of the truss hinge brackets attached to the bus. From the truss hinge bracket, each strap may run through grommets at each truss hinge and may be attached at the outer most tray to adjacent tray truss hinge axle.

The co-wound straps may all feed out at the same rate from one motor 164. The motor may have a large gear reduction driving a worm to a worm wheel. The worm drive pitch may be sized for non-back-drivability so that it may only deploy at the rate the motor turns the worm. The strain-energy-driven characteristic of the system 100-h may always maintain tension on the straps. The motor 164 may have a magnetic detent brake so it will not allow the straps to deploy during random vibration.

Figure 9B:
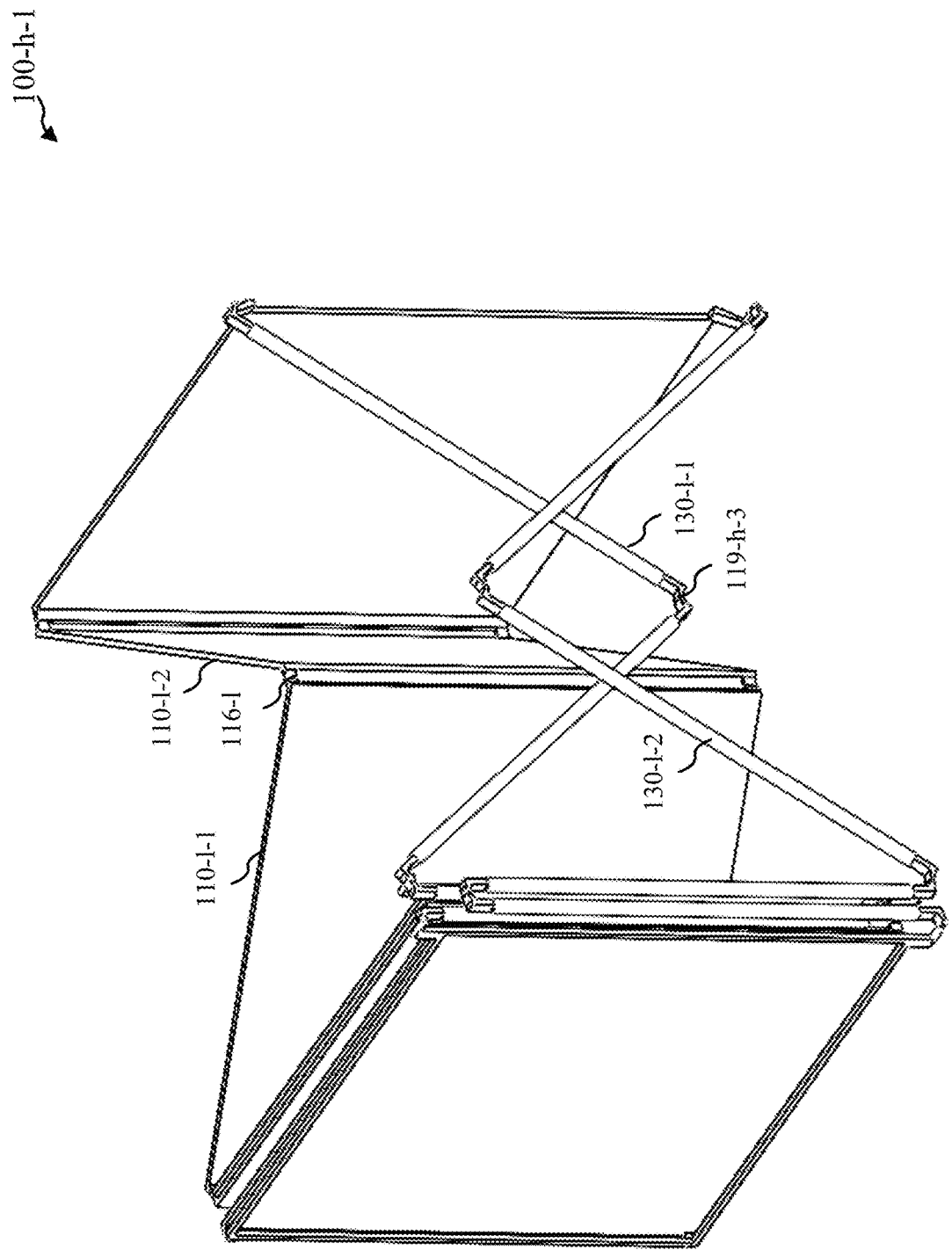

In this embodiment, longerons 130-h-1 and 130-h-2 are generally shown such that hinge 119-h-1 of longeron 130-h-1 and hinge 119-h-2 of longeron 130-h-2 are substantially parallel to a hinge axis 116-h between frames 110-h-1 and 110-h-2. Some embodiments utilize an alternative configuration where hinge 119-h-1 of longeron 130-h-1 and hinge 119-h-2 of longeron 130-h-2 are substantially perpendicular to hinge axis 116-h between frames 110-h-1 and 110-h-2. FIG. 9B provides such an example, which shows aspects of a system 100-h-1 in accordance with various embodiments. System 100-h-1 may be an example of aspects of systems and/or methods of FIG. 1, FIG. 2A, FIG. 2B, FIG. 3A, FIG. 3B, FIG. 3C, FIG. 4A, FIG. 4B, FIG. 4C, FIG. 4D, FIG. 4E, FIG. 4F, FIG. 5, FIG. 6, FIG. 7, FIG. 8, FIG. 9A, FIG. 10A, FIG. 10B, FIG. 10C, FIG. 10D, FIG. 10E, FIG. 11A, FIG. 11B, FIG. 11C, FIG. 12, FIG. 13A, FIG. 13B, and/or FIG. 14. System 100-h-1 may show several components of an individual bay during a stage of deployment. System 100-h-1 shows the orientation of the axis of a hinge 119-h-3 coupled with at least one longeron 130-l-1 with respect to an axis of a hinge 116-l coupled with frames 110-l-1 and 110-l-2. For example, a hinge axis 119-h-3 coupled with at least one longeron 130-l-1 may be substantially perpendicular to a hinge axis 116-l coupled with frames 110-l-1 and 110-l-2. This configuration of axes may ensure synchronous deployment of system 100-h-1. A similarly perpendicular construction can be formed for longeron 130-l-2. As a result of these orientations, each bay of the system 100-h-1 may only be capable of achieving one unique geometry at each stage of deployment. Each bay of the system 100-h-1 may include at least two adjacent frames and the at least one longeron opposing at least the two frames; some embodiments may utilize additional longerons. For example, system 100-h-1 may show two sets of two longerons 130-l-1 and 130-l-2, each coupled with a respective mechanical hinge, such as hinge 119-h-3 for longeron 130-l-1. In this example, substantially perpendicular may generally include orientations that are closer to being perpendicular than to being parallel. This configuration of axes may ensure synchronous deployment of system 100-h-1. As a result of this orientation, each bay of the system 100-h-1 may only be capable of achieving one unique geometry at each stage of deployment.

Turning now to FIG. 10A, FIG. 10B, FIG. 10C, FIG. 10D, and FIG. 10E, aspects of various systems 100-i, 100-i-1, and 100-i-2 are provided in accordance with various embodiments. Systems 100-i, 100-i-1, and/or 100-i-2 may be examples of aspects of systems and/or methods of FIG. 1, FIG. 2A, FIG. 2B, FIG. 3A, FIG. 3B, FIG. 3C, FIG. 4A, FIG. 4B, FIG. 4C, FIG. 4D, FIG. 4E, FIG. 4F, FIG. 5, FIG. 6, FIG. 7, FIG. 8, FIG. 9A, FIG. 9B, FIG. 11A, FIG. 11B, FIG. 11C, FIG. 12, FIG. 13A, FIG. 13B, and/or FIG. 14. Systems 100-i generally show aspects of one or more sequencers 160-i.

For example, system 100-i may be shown in various stages of deployment that may emphasize deployment control. One or more escapement mechanisms (or sequencers) 160-i may allow only one bay of the structure to deploy. For example, a pin 134 or other component(s) coupled with a frame may rotate in a matching socket 135 on another frame as one bay deploys. Once the frame to which the component 134 is coupled reaches a desired angle relative to the socket 135 coupled with the other frame, the component 134 may be free to release, such as through a slot, which may allow the next bay to begin deployment. The sequencer 160-i may integrate with the frame/element structure.

The sequencer 160-i may be used to constrain subsequent bays until full deployment of the previous bay has been achieved. In some embodiments, sequencers 160-i may be incorporated in both the upper and lower deck components to provide redundancy; however, both may not be needed. Merely by way of example, as the sequencer bolt/pin 134 located on the deploying truss hinge engages the sequencer arm/socket 135 that is constraining the next bay, it generally causes the sequencer arm to rotate down, releasing the sequencer bolt on the next truss hinge. This generally allows the next bay to begin deployment. This process may be repeated for each bay until full deployment is achieved. In some embodiments, one or more frames from the multiple frames include at least one or more pins or one or more sockets such that: a respective pin coupled with a respective frame rotates in a respective socket of another one of the frames during deployment; and the respective pin is released from the respective socket to release the respective element frame. In some embodiments, at least the one or more pins or the one or more sockets are configured to sequentially deploy the multiple frames.

Figure 10A:
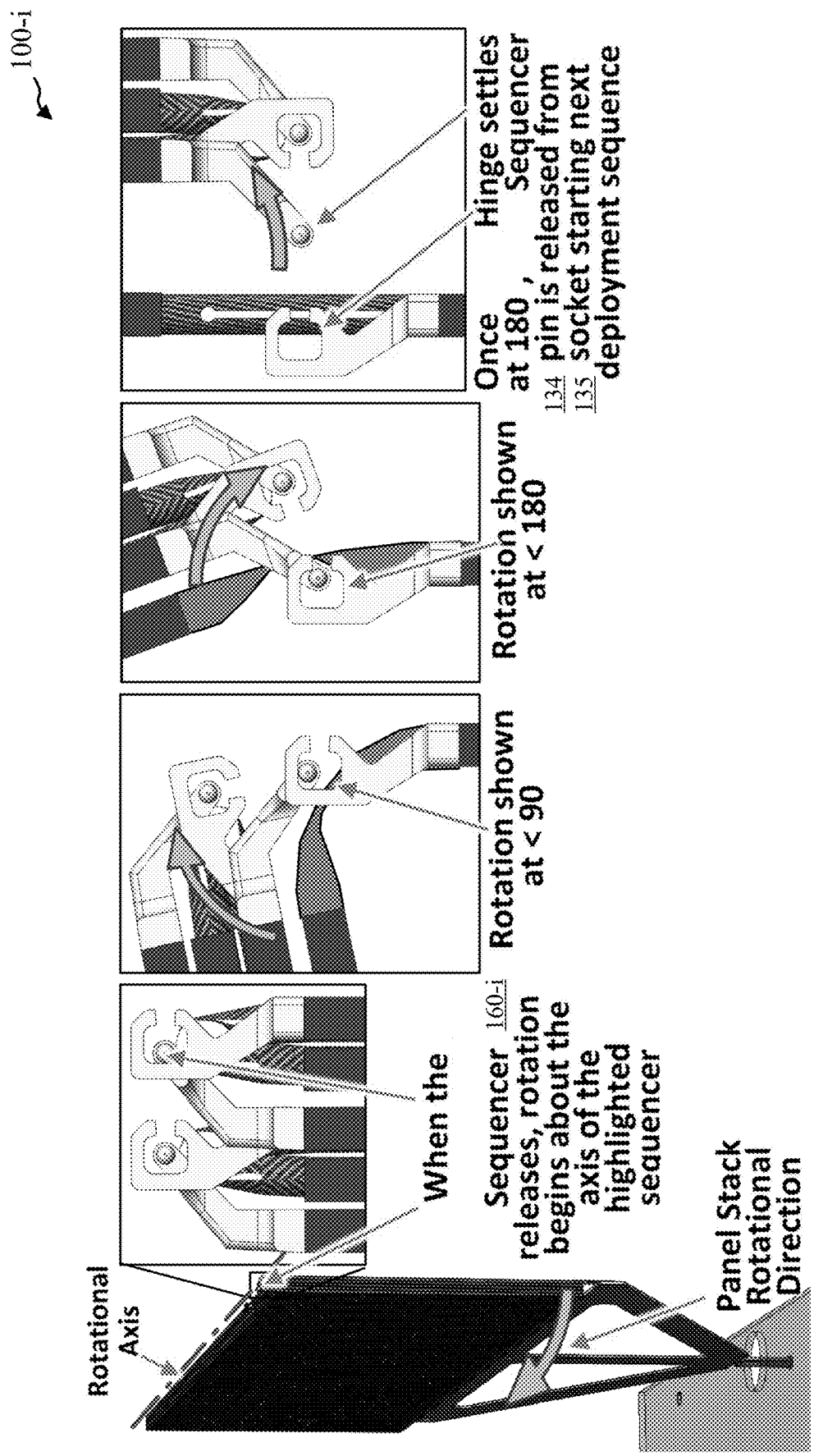
FIG. 10A, FIG. 10B, FIG. 10C, FIG. 10D, and FIG. 10E show aspects of systems in accordance with various embodiments.
Figure 10B:
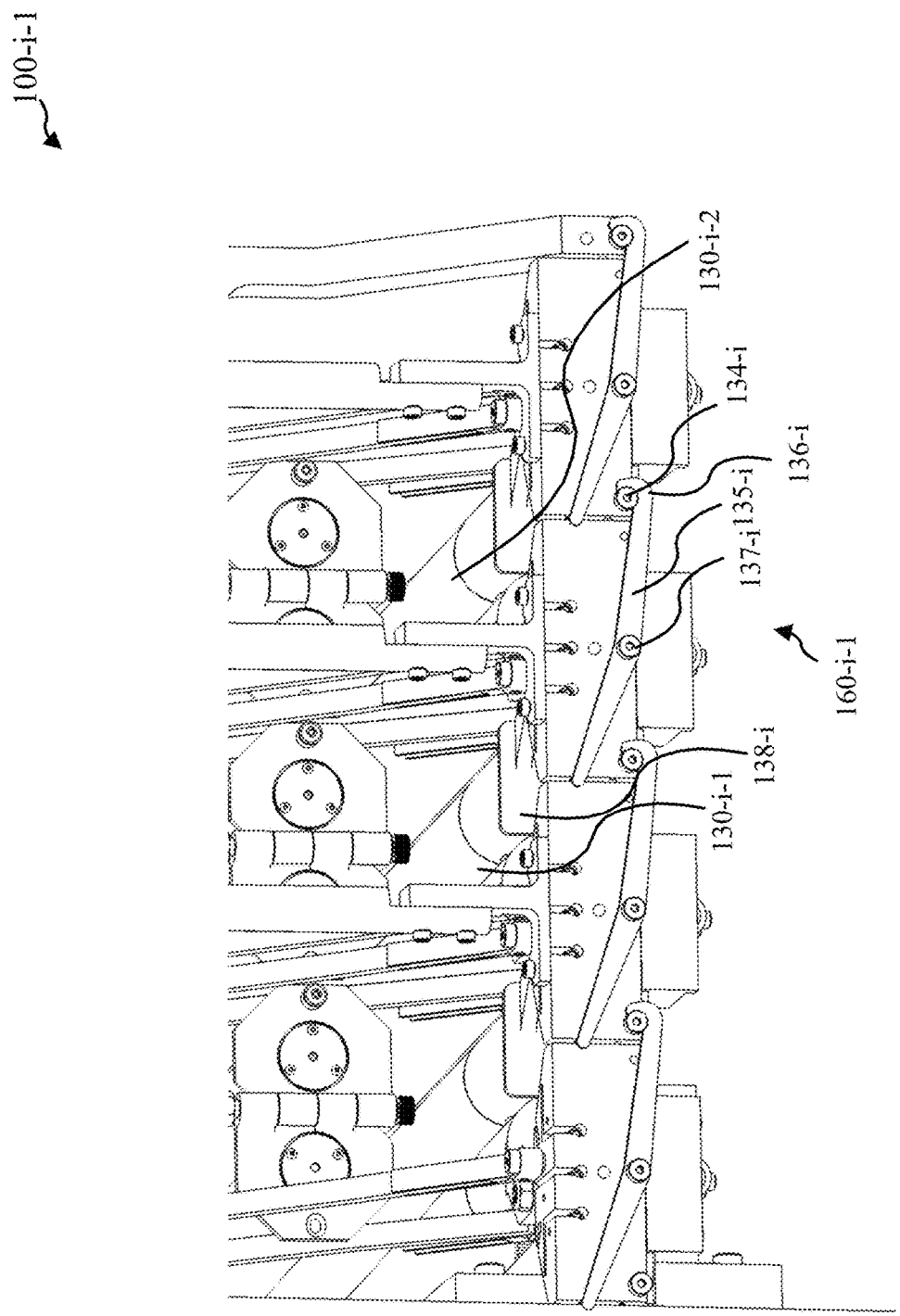
Figure 10C:
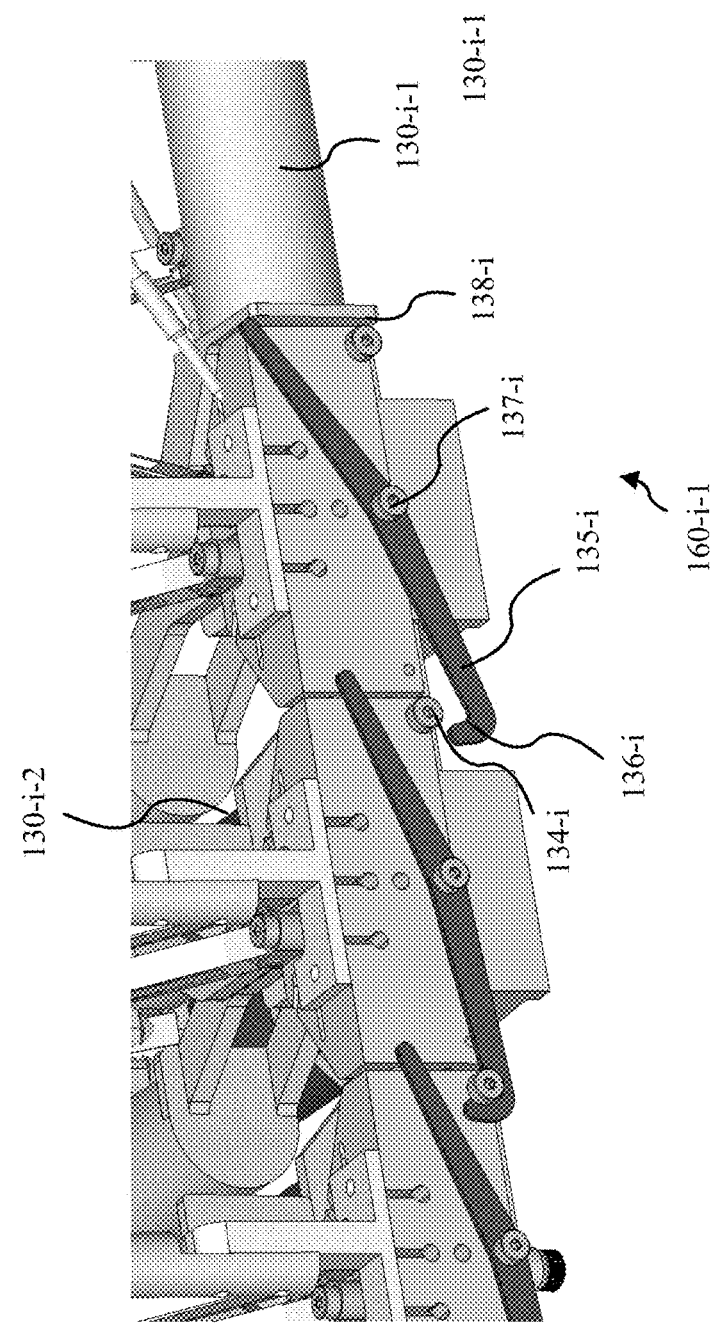

FIG. 10B, FIG. 10C, FIG. 10D, and FIG. 10E provide examples of sequencers 160-i-1 and 160-i-2 in accordance various embodiments. For example, FIG. 10B and FIG. 10C show one or more sequencers 160-i-1 that may include a hooked lever 135-i with a pivot 137-i such that the hooked lever 135-i hooks around at least a portion of a pin 134-i in a stowed state. In this example, one sequencer 160-i-1 is specifically called out, though multiple sequencers are shown. Sequencer 160-i-1 may be referred to as a longeron sequencer. Sequencer 160-i-1 along with the other sequencers may be configured to sequentially deploy the multiple frames and/or longerons. In some embodiments, the pivot 137-i of the hooked lever 135-i is coupled with a first foldable longeron 130-i-1 from the multiple longerons and a hook 136-i of the hooked lever 135-i couples with a pin 134-i that is coupled with a second foldable longeron 130-i-2 from the multiple longerons such that the hooked lever 135-i is released from the pin 134-i through contact with a portion 138-i of first foldable longeron 130-i-1 as the first foldable longeron 130-i-1 fully deploys. FIG. 10B shows system 100-i-1 in a stowed state, while FIG. 10C shows a deployed state.

Figure 10D:
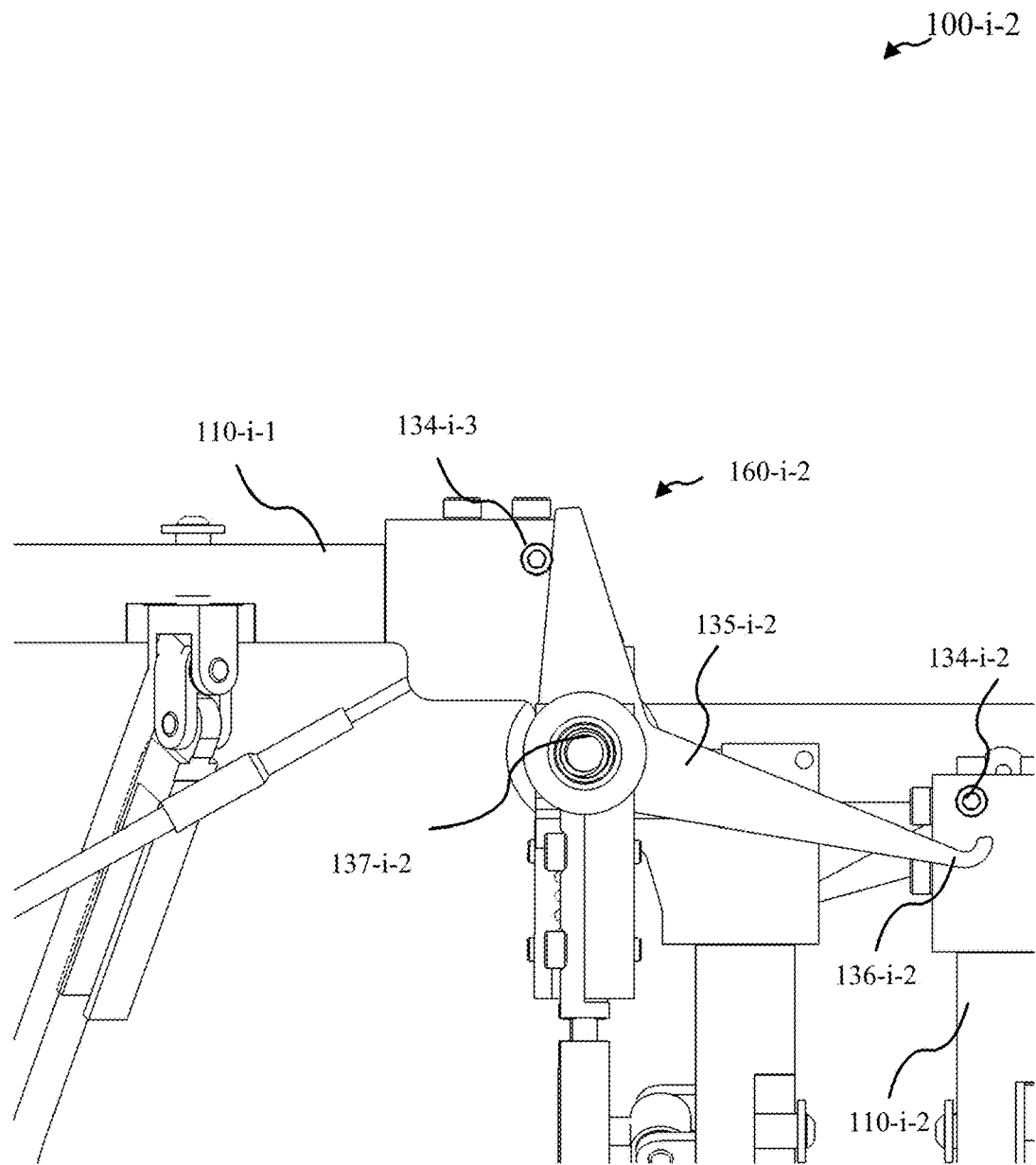
Figure 10E:
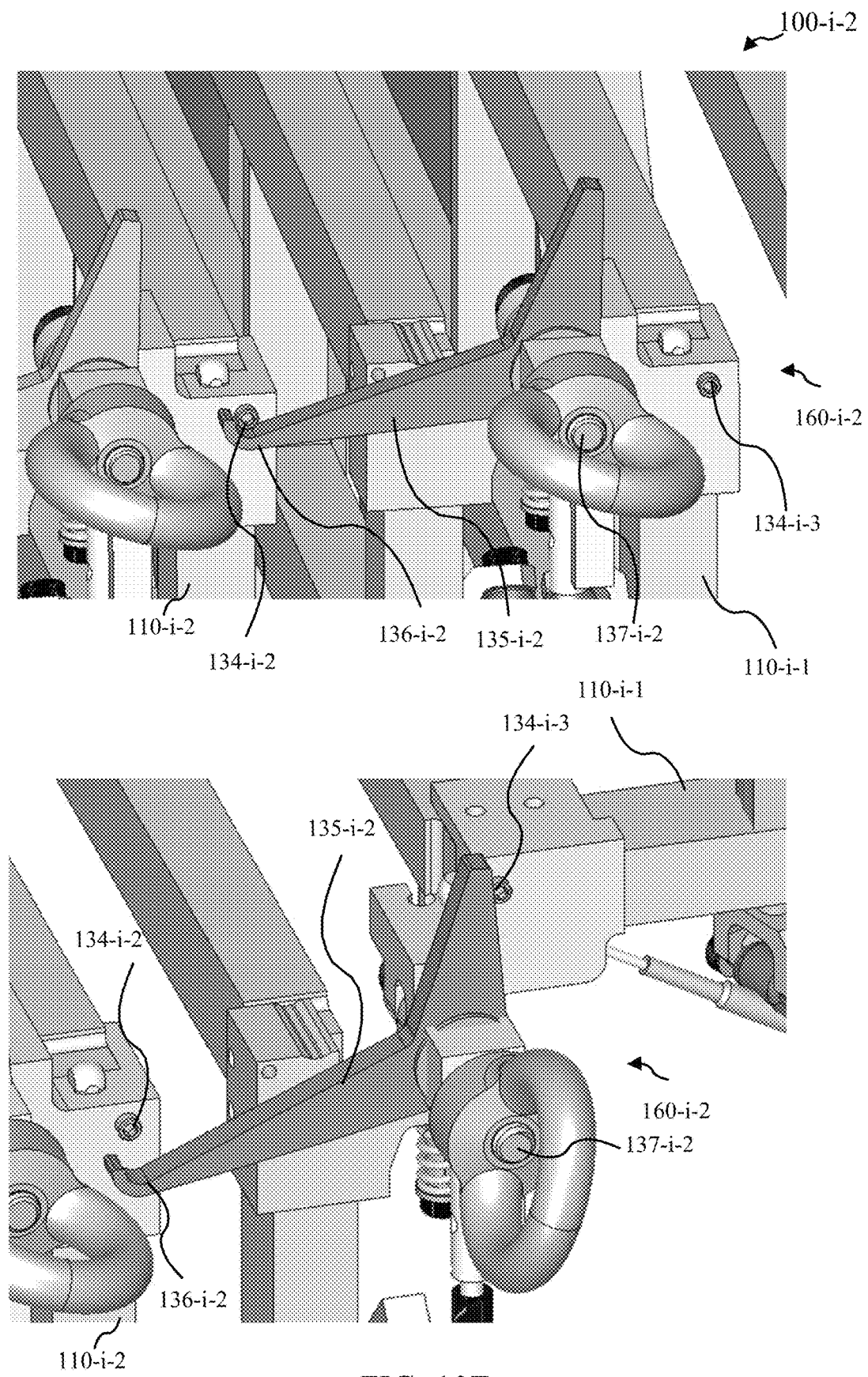

FIG. 10D and FIG. 10E show one or more sequencers 160-i-2 that may include a hooked lever 135-i-2 with a pivot 137-i-2 such that the hooked lever 135-i-2 hooks around at least a portion of a pin 134-i-2 in a stowed state. In this example, one sequencer 160-i-2 is specifically called out, though multiple sequencers may be utilized. Sequencer 160-i-2 may be referred to as a frame sequencer. Sequencer 160-i-2 along with other sequencers may be configured to sequentially deploy the multiple frames. In some embodiments, the pivot 137-i-2 of the hooked lever 135-i-2 is coupled with a first frame 110-i-1 from the multiple frames and a hook 136-i-2 of the hooked lever 135-i-2 couples with at least the portion of the pin 134-i-2 that is coupled with a second frame 110-i-2 from the multiple frames such that the hooked lever 135-i-2 releases from the pin 134-i-2 through contact between the hooked lever 135-i-2 and a stop 134-i-3 coupled with the first frame when the first frame fully deploys. Stop 134-i-3 may be an example of a pin coupled with first frame 110-i-1. FIG. 10E shows a deployment sequence from a stowed state to a deployed state for sequencer 160-i-2.

Figure 11A:
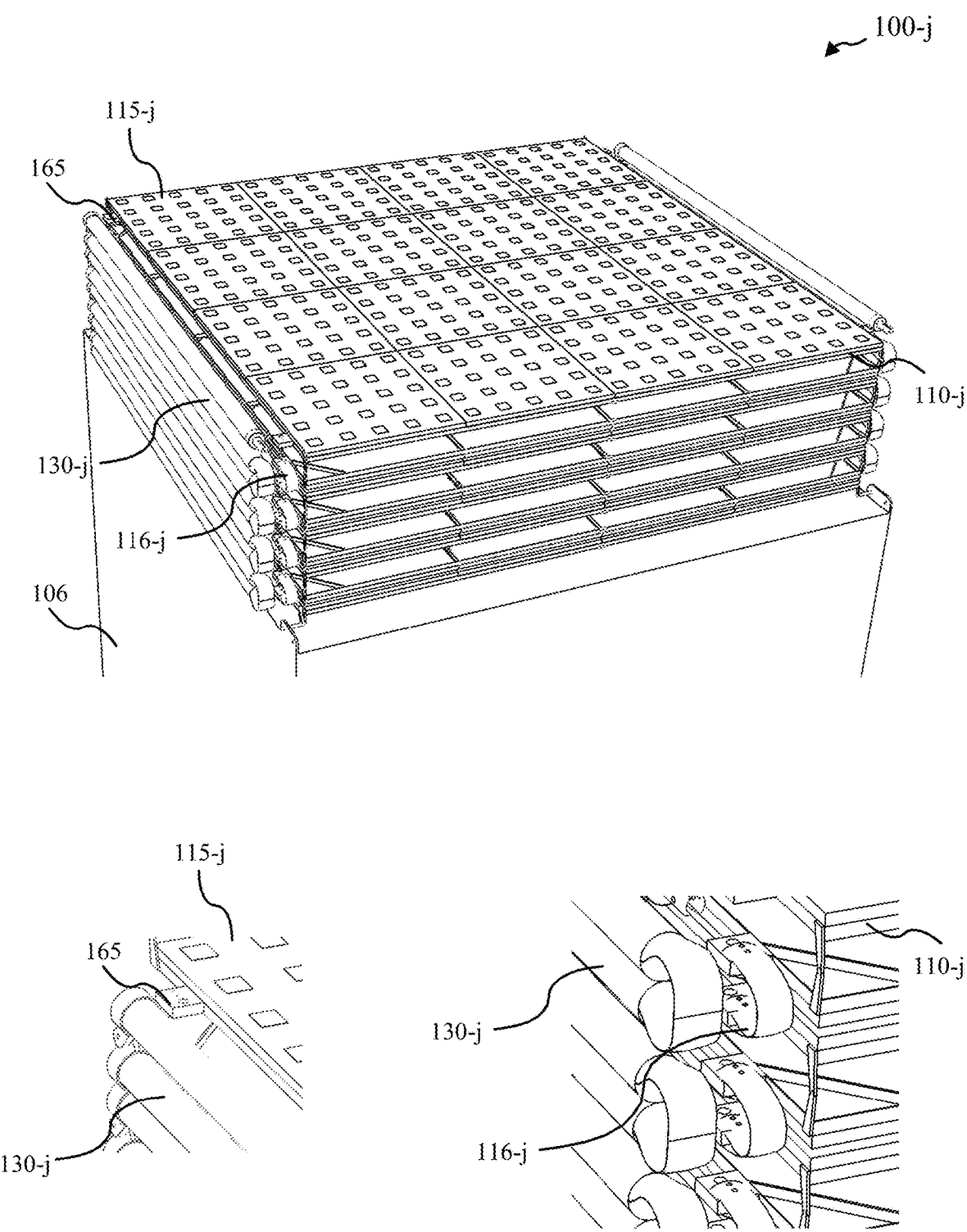
FIG. 11A, FIG. 11B, and FIG. 11C show aspects of systems in accordance with various embodiments.

FIG. 11A shows aspects of a system 100-j in accordance with various embodiments. System 100-j may show a launch configuration. System 100-j may be an example of aspects of systems and/or methods of FIG. 1, FIG. 2A, FIG. 2B, FIG. 3A, FIG. 3B, FIG. 3C, FIG. 4A, FIG. 4B, FIG. 4C, FIG. 4D, FIG. 4E, FIG. 4F, FIG. 5, FIG. 6, FIG. 7, FIG. 8, FIG. 9A, FIG. 9B, FIG. 10A, FIG. 10B, FIG. 10C, FIG. 10D, FIG. 10E, FIG. 11B, FIG. 12, FIG. 13A, FIG. 13B, and/or FIG. 14. The frame 110-j/element 115-j array may be z-folded against an interface structure 106, such as a spacecraft, for example, and preloaded with one or more hold down and release mechanisms (HDRM(s)). The HDRM(s) may include preload kinematic mounts 165 as part of pass-through areas, which may be integrated with the corners of the frame 110-j. Hinges 116-j, such as tape spring hinges, and stowed longeron(s) 130-j may stow outside the frame 110-j volume. Space of frames of elements 115-j may be adjusted to maintain dynamic clearance. Some embodiments include snubbers that may be incorporated with the frames 110-j. Diagonal(s) and/or batten(s) (not shown) may be stowed and managed in the volume between the stowed frames 110-j back sides. System 100-j may provide for the ability for the stiff, deep truss to be collapsed into an accordion-folded panel stack for efficient stowage. Stowage generally also involves the manipulation of the truss components, including the longerons, diagonals, and battens. FIG. 11A shows an example of how these various components may be arranged in the stowed configuration.

In the stowed configuration, the stowed wings may be launch locked against the spacecraft using the four HDRM(s) 165 in the four locations. The HDRM(s) 165 may preload kinematic mounts (often called "cup-cones") which may be integrated to the frames 110-j outboard of the region in which the elements 115-j may be integrated. Some embodiments utilize Frangibolts as the HDRM(s) 165 but other options may be utilized.

The folded frames 110-*j* of the system 100-*j* may be restrained by the HDRM(s) 165 through two elongated cups (or "V"s) and two flat bumpers on one face of each tray that may mate with two truncated half football-shaped cones mating to the cups and two flat bumpers on the opposite face. The arrangement of the cup-cone-bumpers may be kinematically determinate, forming a kinematic attachment to the bus or adjacent frames within the plane of the frames. Each cup-cone-bumper stack may be mated and preloaded to either one of four bus mounted stanchions or the adjacent frame's cups or bumpers by the HDRM(s) 165.

The kinematic arrangement of the cup/cone/bumpers may allow for tolerance build up at assembly, as well as any geometric changes due to thermal excursions prior to launch restraint release. Upon actuation, the Frangibolt's tensioned bolt or other HDRM(s) may be retracted from the cup/cone stack such that it stays out of the RF excursion zone, for example.

Figure 11B:
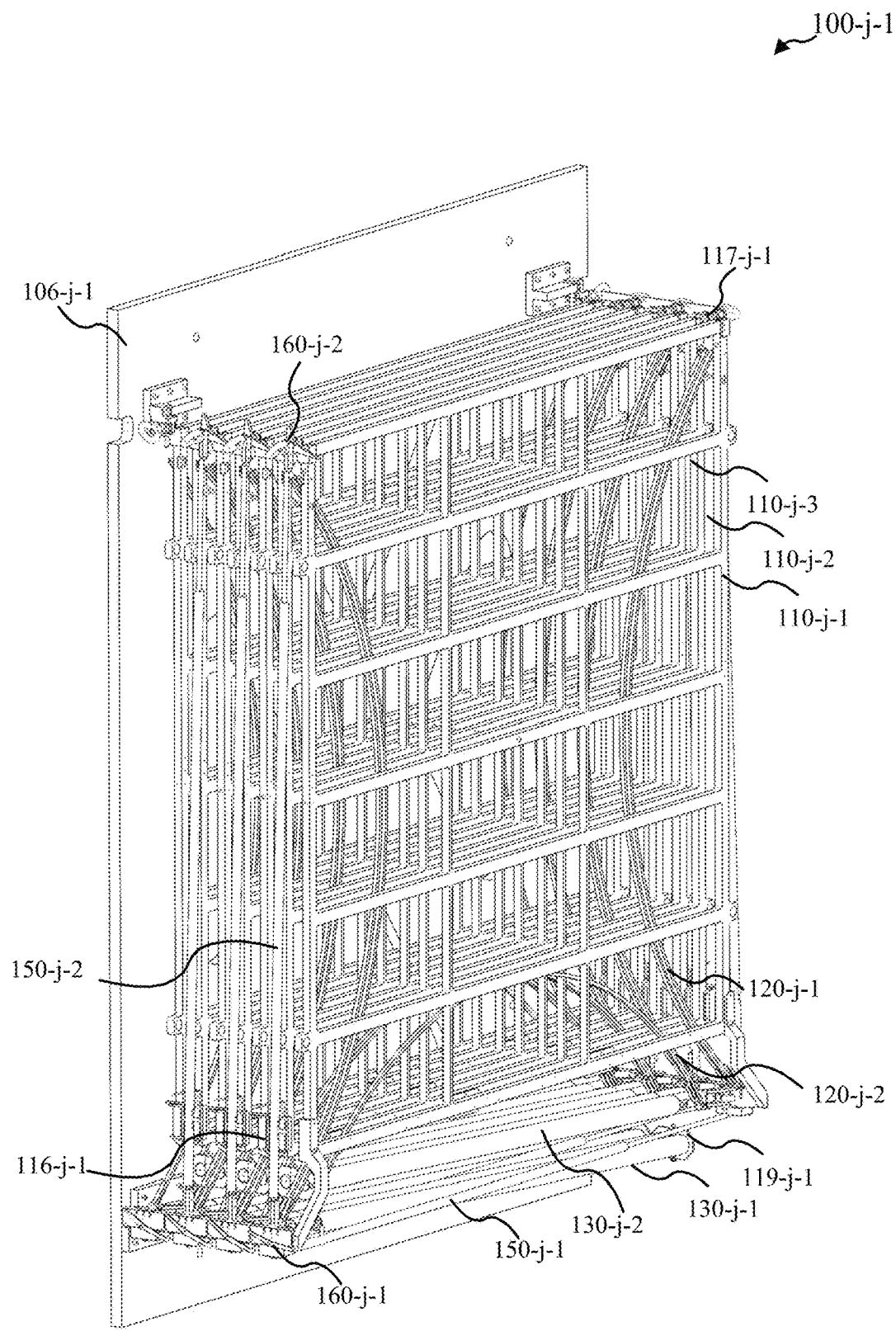

FIG. 11B shows aspects of a system 100-*j*-1 in accordance with various embodiments. System 100-*j*-1 may show a launch or stowed configuration. System 100-*j*-1 may be an example of aspects of systems and/or methods of FIG. 1, FIG. 2A, FIG. 2B, FIG. 3A, FIG. 3B, FIG. 3C, FIG. 4A, FIG. 4B, FIG. 4C, FIG. 4D, FIG. 4E, FIG. 4F, FIG. 5, FIG. 6, FIG. 7, FIG. 8, FIG. 9A, FIG. 9B, FIG. 10A, FIG. 10B, FIG. 10C, FIG. 10D, FIG. 10E, FIG. 11B, FIG. 12, FIG. 13A, FIG. 13B, and/or FIG. 14. System 100-*j*-1 is shown without elements present so that the multiple frame 110-*j* and battens 120-*j* may be seen.

The multiple frames 110-*j*-1 may be z-folded against a portion of a interface structure 106-*j*-1, for example. In some embodiments, the multiple frames 110-*j*-1, 110-*j*-2, and 110-*j*-3 are coupled with each other utilizing one or more hinges, such as center hinges 116-*j*-1 or truss hinges 117-*j*-1. Truss hinges 117-*j*-1 generally rotate around a pivot point that is offset opposite from an outer face of a first frame 110-*j*-1 from the multiple frames and from an outer face of a second frame 110-*j*-2 from the multiple frames such that the first frame and the second frame make contact between a cup coupled with the first frame and a cone coupled with a second frame at an end of deployment and a spring preloads an interface between the cup and the cone. Center hinge 116-*j*-1 generally includes a first hinge axis that rotates around a pivot point that is offset neighboring to an outer face of a first frame 110-*j*-2 of the multiple frames and an outer face of a second frame 110-*j*-3 of the multiple frames and a second hinge axis that rotates the first hinge axis away from the outer face of the first frame and the outer face of the second frame as the first frame and the second frame deploy.

System 100-*j*-1 also includes multiple folded longerons 130-*j*-1 that each include a hinge axis (of a mechanical hinge 119-*j*-1) that is substantially perpendicular to a hinge axis (such as the hinge axis of truss hinge 117-*j*-1) coupled with two or more frames 110-*j*-1 and 110-*j*-2 from the multiple frames. The folded longerons 130-*j*-1 may also be coupled with one or more sequencers 160-*j*-1, which may be referred to as longeron sequencers, and one or more sequencers 160-*j*-2, which may be referred to as frame sequencers. Sequencers 160-*j* may include a hooked lever with a pivot such that the hooked lever hooks around at least a portion of a pin in a stowed state. The sequencers 160-*j* may be configured to sequentially deploy the multiple frames. Sequencers 160-*j*-2 generally are configured such that the pivot of the hooked lever is coupled with a first frame from the multiple frames and a hook of the hooked lever couples with at least the portion of the pin that is coupled with a second frame from the multiple frames such that the hooked lever releases from the pin through contact between the hooked lever and a stop coupled with the first frame when the first frame fully deploys. Sequencers 160-*j*-1 are generally configured such that the pivot of the hooked lever is coupled with a first foldable longeron from the multiple longerons and a hook of the hooked lever couples with a pin that is coupled with a second foldable longeron from the multiple longerons such that the hooked lever is released from the pin through contact with a portion of the first foldable longeron as the first foldable longeron fully deploys.

System 100-*j*-1 generally includes multiple buckled battens 120-*j*, such as batten 120-*j*-1 and batten 120-*j*-2. Buckled batten 120-*j*-2 provides an example of a buckled batten that may be coupled with two longerons, such as longeron 130-*j*-1 and 130-*j*-2) such that the buckled batten is offset with respect to a hinge point between the two longerons such that the buckled batten is in compression during deployment. Buckled batten 120-*j*-1 provides an example of a buckled batten that is generally coupled with one or more longerons, such as longeron 130-*j*-1, from the multiple longerons and one or more frames 110-*j*-1 from the multiple frames such that the buckled batten 120-*j*-1 is offset at least along a length of the respective frame 110-*j*-1 with respect to a hinge point (such as with respect to truss hinge 117-*j*-1) between the respective frame 110-*j*-1 and another frame from the multiple frames. System 100-*j*-1 may also include multiple diagonals (not shown) that may be tensioned by one or more of the buckled battens 120-*j*.

System 100-*j*-1 may include one or more warping restraints, such as warping restraint components 150-*j*-1 and 150-*j*-2 (which may be referred to as articulating members) that may interface with one or more of the frames from the multiple frames 110-*j*, one or more of the longerons from the multiple longerons 130-*j*, and one or more of the battens from the multiple battens 120-*j* such that a kinematic motion of the system 100-*j*-1 is restricted and a synchronous deployment of the system 100-*j*-1 is ensured. The one or more warping restraints, such as warping restraints components 150-*j*-1 and 150-*j*-2 may form a planar assembly of articulating members that have freedom to at least extend in length while being resistant to at least lateral bending or torsional deformation such that the planar assembly of articulating members are configured to at least expand or distort in a plane of the articulating members and are restricted from warping out of the plane of the articulating members. The articulating members may include telescoping members. In general, the warping restraints 150-*j*-1 and 150-*j*-2 are semi-rigid planar structures aligned generally perpendicular to the common plane of the deployed frames 110-*j* and free to move during deployment without inducing significant parasitic drag or friction to the remainder of the system but interconnected with the other elements of the system so as to restrict the kinematic motion of the system and ensure synchronous deployment of the system.

Figure 11C:
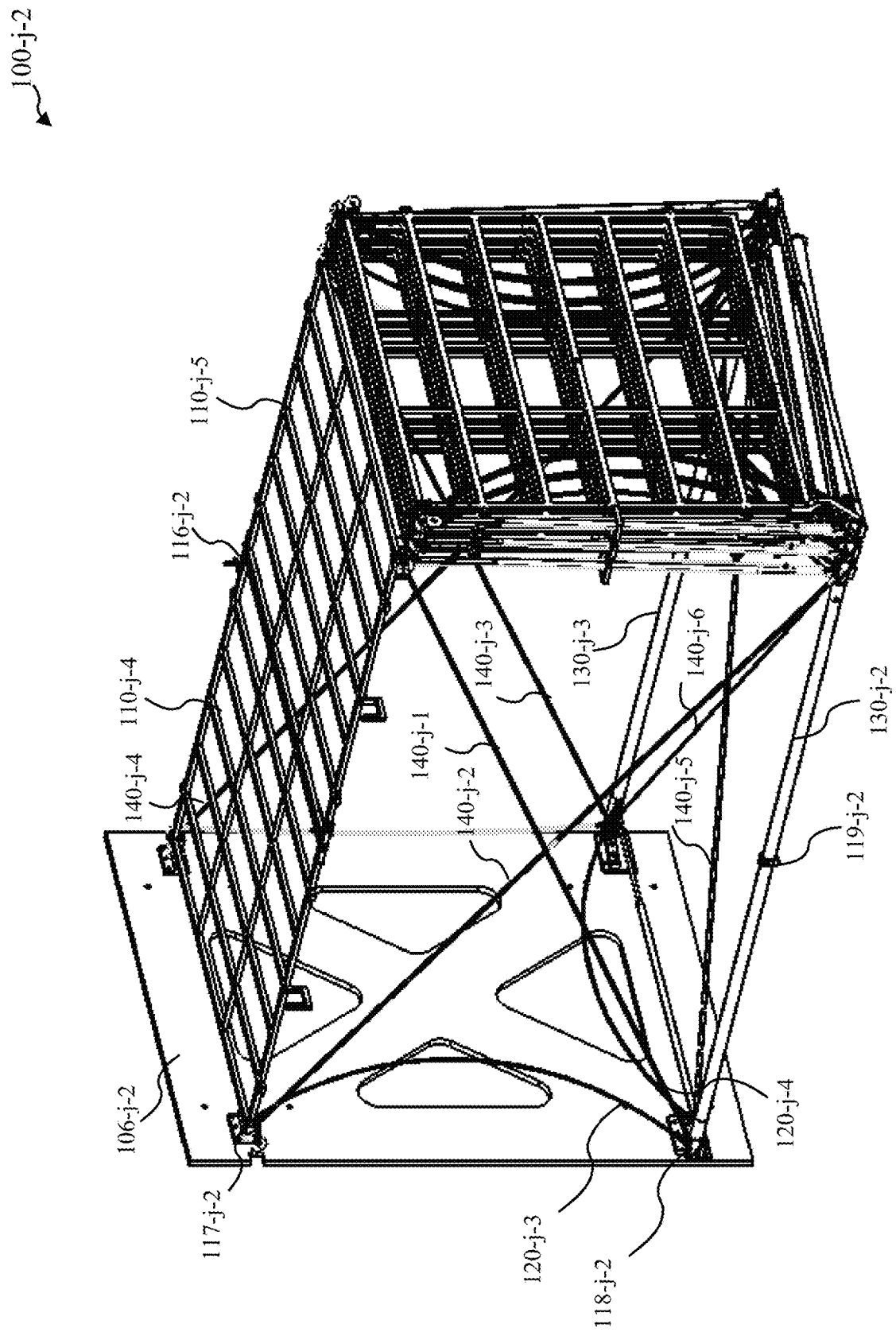

FIG. 11C shows aspects of a system 100-*j*-2 in accordance with various embodiments. System 100-*j*-2 may show a partial deployment configuration, showing a single root bay deployed. System 100-*j*-2 may be an example of aspects of systems and/or methods of FIG. 1, FIG. 2A, FIG. 2B, FIG. 3A, FIG. 3B, FIG. 3C, FIG. 4A, FIG. 4B, FIG. 4C, FIG. 4D, FIG. 4E, FIG. 4F, FIG. 5, FIG. 6, FIG. 7, FIG. 8, FIG. 9A, FIG. 9B, FIG. 10A, FIG. 10B, FIG. 10C, FIG. 10D, FIG. 10E, FIG. 11B, FIG. 12, FIG. 13A, FIG. 13B, and/or FIG.

14. System 100-*j*-2 is shown without elements 115 present so that the multiple frames 110-*j* and other components may be seen. System 100-*j*-2 may show the root bay deployment of system 100-*j*-1. For example, system 100-*j*-2 generally highlights the components of an individual deployed root bay. System 100-*j*-2 generally includes the same components of system 100-*j*-1 of FIG. 11B, with some additional components such as diagonals shown. System 100-*j*-2 highlights offset buckled battens 120-*j*-3 and 120-*j*-4, longerons 130-*j*-2 and 130-*j*-3, and/or diagonals 140-*j*-1, 140-*j*-2, 140-*j*-3, 140-*j*-4, 140-*c*-5, and 140-*j*-6. The longerons 130-*j* may be referred to as longeron assemblies and may include a hinged portion on each longeron, such as hinge portion 119-*j*-2 of longeron 130-*j*-2, such as a mechanical hinge. System 100-*j*-1 highlights frames 110-*j*-4 and 110-*j*-5. Center hinges 116-*j*-2 and/or truss hinges 117-*j*-2 may couple frames with each other (or to an interface structure 106-*j*-2) and allow for frames 110-*j* to fold up for stowage and to facilitate deployment. In particular, frames 110-*j*-4 and 110-*j*-5 may be shown deployed. In some embodiments, frames 110-*j*-4 and 110-*j*-5 are coupled with each other utilizing one or more hinges, such as center hinges 116-*j*-2.

Buckled batten 120-*j*-3 provides an example where the batten 120-*j*-3 may be coupled with longeron 130-*j*-2 from the multiple longerons and frame 110-*j*-4 from the multiple frames such that the batten 120-*j*-3 is offset with respect to a hinge point (such as at truss hinge 117-*j*-2) between frame 110-*j*-4 and interface structure 106-*j*-2. Batten 120-*j*-3 may be coupled with longeron 130-*j*-2 such that it may be aligned with a hinge point (such as at hinge 118-*j*-2). Batten 120-*j*-4 may provide an example where the buckled batten 120-*j*-4 is coupled with longeron 130-*j*-2 and longeron 130-*j*-3 such that buckled batten 120-*j*-4 may be offset with respect to a hinge point (such as with respect to hinge 118-*j*-2) of longeron 130-*j*-2 and a hinge point of the longeron 130-*j*-3 such that buckled batten 120-*j*-4 is in compression during deployment.

In general, side tensioned diagonals 140-*j*-1 and 140-*j*-2 may be tensioned by buckled batten 120-*j*-3. Side tensioned diagonals 140-*j*-3 and 140-*j*-4 may be tensioned by buckled battens obscured from view. Bottom tensioned diagonals 140-*j*-5 and 140-*j*-6 may be tensioned by buckled batten 120-*j*-4.

System 100-*j*-3 shows the orientation of an axis of a hinge 119-*j*-2 coupled with longeron 130-*j*-2 with respect to an axis of a hinge 116-*j*-2 coupled with two or more frames 110-*j*-4 and 110-*j*-5 (or hinge 117-*j*-2 coupling frame 110-*j*-4 with interface structure 106-*j*-2). For example, a hinge axis 119-*j*-2 coupled with longeron 130-*j*-2 may be substantially perpendicular to a hinge axis 116-*j*-2 coupled with frames 110-*j*-4 and 110-*j*-5 (or hinge axis 117-*j*-2 coupled with frame 110-*j*-4 and interface structure 106-*j*-2).

Figure 12:
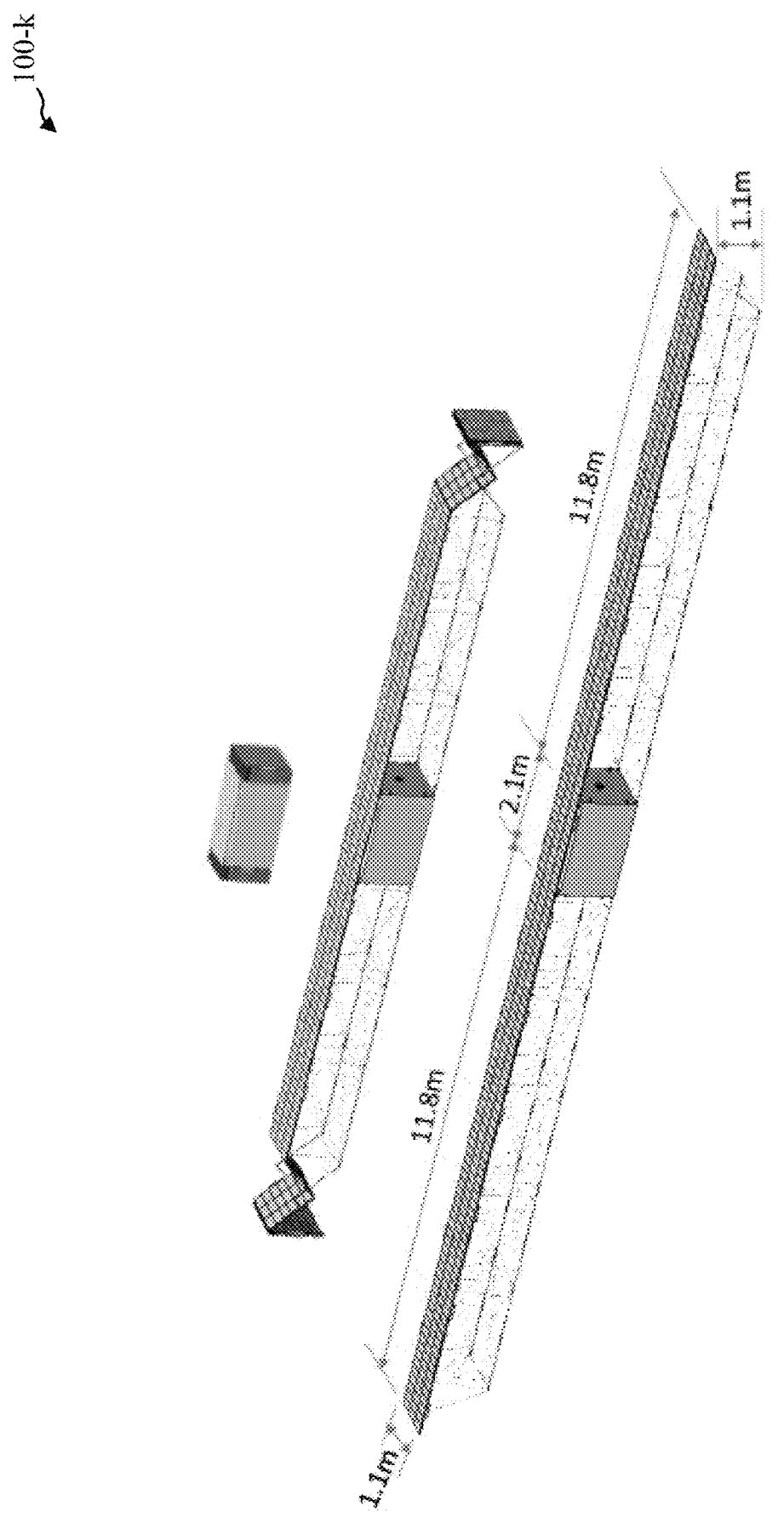
FIG. 12 shows aspects of a system in accordance with various embodiments.

FIG. 12 shows aspects of a system 100-*k* in a stowed, partially deployed, and fully deployed configuration in accordance with various embodiments. System 100-*k* may be an example of aspects of systems and/or methods of FIG. 1, FIG. 2A, FIG. 2B, FIG. 3A, FIG. 3B, FIG. 3C, FIG. 4A, FIG. 4B, FIG. 4C, FIG. 4D, FIG. 4E, FIG. 4F, FIG. 5, FIG. 6, FIG. 7, FIG. 8, FIG. 9A, FIG. 9B, FIG. 10A, FIG. 10B, FIG. 10C, FIG. 10D, FIG. 10E, FIG. 11A, FIG. 11B, FIG. 11C, FIG. 13A, FIG. 13B, and/or FIG. 14. The dimensions noted are merely provided as examples; other dimensions may be utilized. This embodiment includes two deployable wings that may utilize the various backing structures in accordance with various embodiments. The backing or truss structure may be collapsed for stowage into a small volume for launch. Upon deployment, the formation of the deep truss backing structure may provide for high deployed stiffness at a low areal mass. Furthermore, a stiff, near-zero CTE structure may provide for excellent on-orbit shape stability. System 100-*k* may be configured to deploy one bay at a time, with the root bay deploying first. By forming the root bays first, the deploying system is generally, strong, stiff, and stable throughout deployment.

Figure 13A:
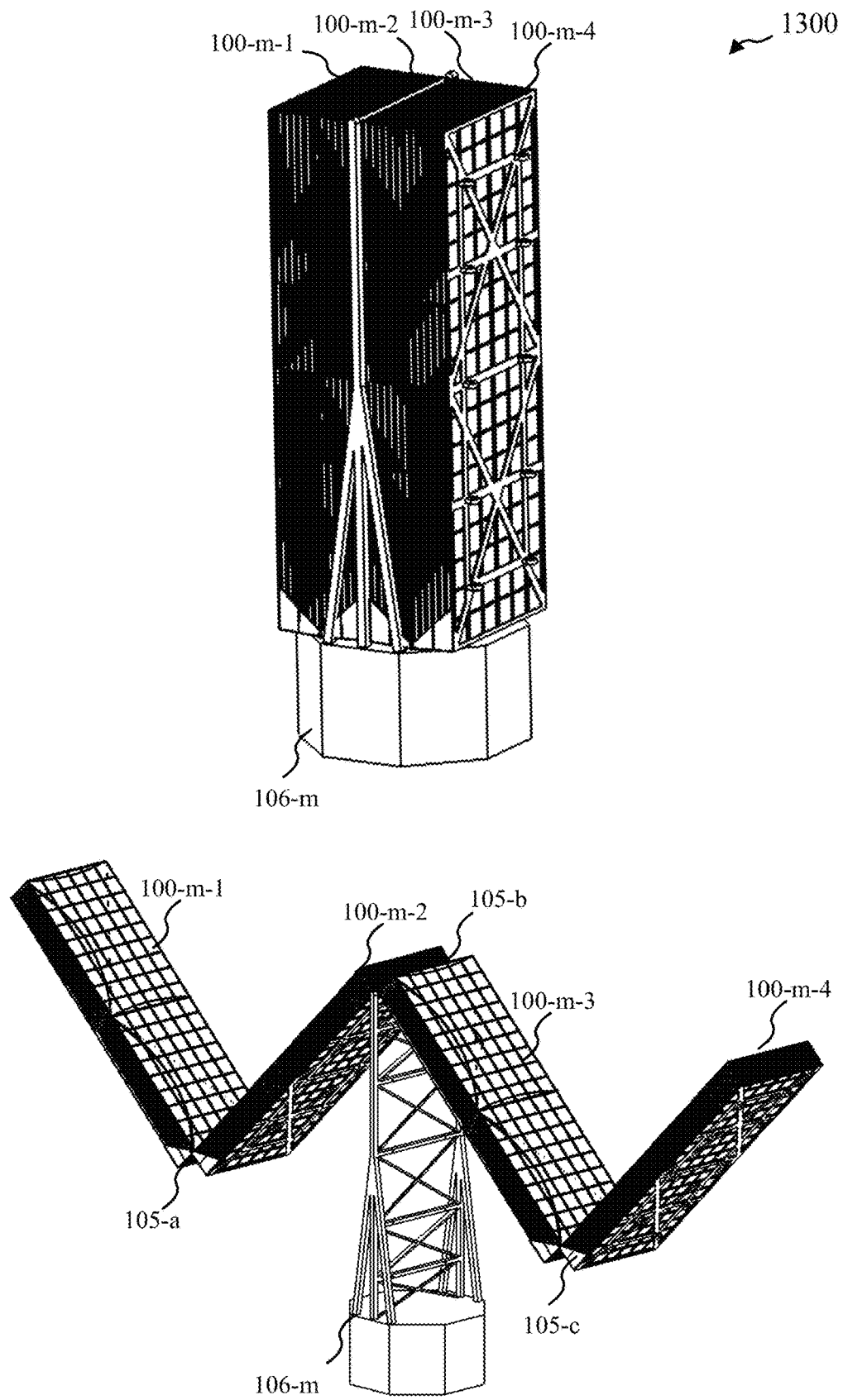
FIG. 13A and FIG. 13B show aspects of systems in accordance with various embodiments.
Figure 13B:
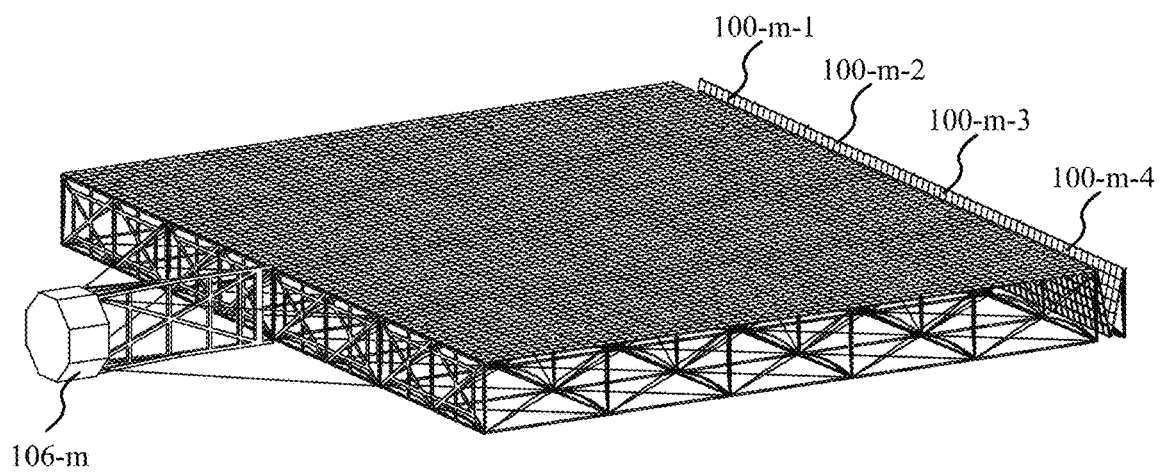
Figure 13B:
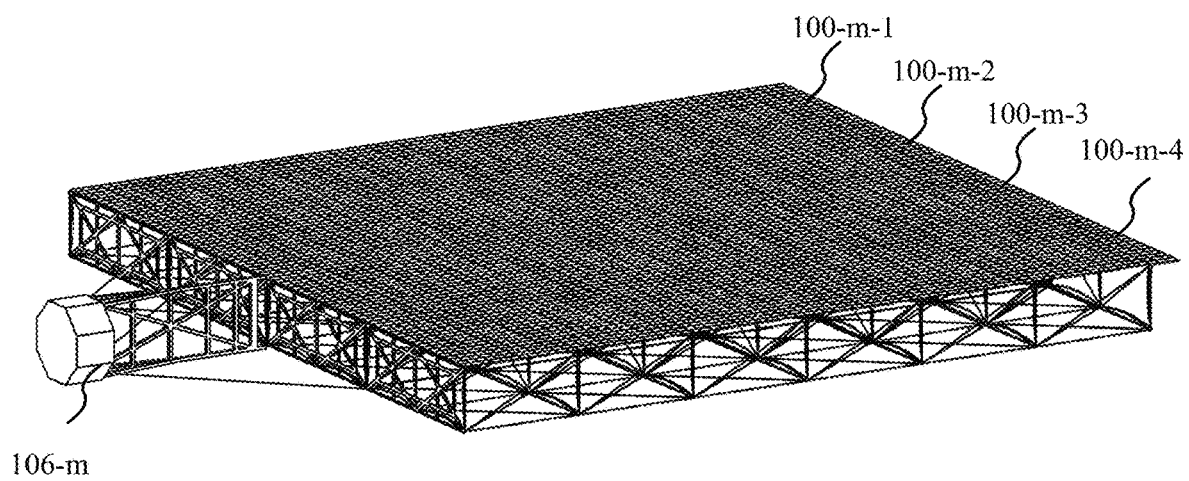

FIG. 13A and FIG. 13B show aspects of a system 1300 in various stages from stowed stage to a fully deployed state. System 1300 generally includes multiple subsystems 100-*m*-1, 100-*m*-2, 100-*m*-3, and 100-*m*-4, where each subsystem 100-*m* may be an example of aspects of systems and/or methods of FIG. 1, FIG. 2A, FIG. 2B, FIG. 3A, FIG. 3B, FIG. 3C, FIG. 4A, FIG. 4B, FIG. 4C, FIG. 4D, FIG. 4E, FIG. 4F, FIG. 5, FIG. 6, FIG. 7, FIG. 8, FIG. 9A, FIG. 9B, FIG. 10A, FIG. 10B, FIG. 10C, FIG. 10D, FIG. 10E, FIG. 11A, FIG. 11B, FIG. 11C, FIG. 12, and/or FIG. 14. This embodiment includes the four subsystems 100-*m*-1, 100-*m*-2, 100-*m*-3, and 100-*m*-4 that may utilize the various backing structures in accordance with various embodiments. Each of the subsystems 100-*m*-1, 100-*m*-2, 100-*m*-3, and 100-*m*-4 may be referred to as a column structure, where each column structure includes multiple bays (six bays for example). Other embodiments may include more or fewer column structures and/or bays.

FIG. 13A shows a stowed state of the system 1300 in the upper portion, while the lower portion shows a first phase of deployment that may involve a transverse deployment of column stacks. The column structures 100-*m*-1, 100-*m*-2, 100-*m*-3, and 100-*m*-4 generally unfold with respect to column-to-column hinge lines 105-*a*, 105-*b*, and 105-*c* and latch to each other. System 1300 may also include an interface structure 106-*m* that the four subsystems 100-*m*-1, 100-*m*-2, 100-*m*-3, and 100-*m*-4 may couple with. FIG. 13B shows a second phase of deployment as the bays sequentially deploy (upper portion) beginning with the root bay. For the second deployment phase, a motor-driven lanyard system may limit the deployment rate. The system 1300 is generally deployed one bay at a time, beginning with the root bay. A sequencing system may allow each bay to become tensioned prior to the next bay beginning deployment. This approach generally ensures that the deployment is predictable, stable, and the structure has high stiffness throughout deployment. The system is modular such that overall dimensions of the array can be easily altered. The lower portion of FIG. 13B shows the fully deployed system. The various structures and methods disclosed throughout with regard to the various systems and subsystems generally provide determinate structures.

Turning now to FIG. 14, a flow diagram of a method 1400 of deploying a system is shown in accordance with various embodiments. Method 1400 may be implemented utilizing a variety of systems and/or devices such as those shown and/or described with respect to FIG. 1, FIG. 2A, FIG. 2B, FIG. 3A, FIG. 3B, FIG. 3C, FIG. 4A, FIG. 4B, FIG. 4C, FIG. 4D, FIG. 4E, FIG. 4F, FIG. 5, FIG. 6, FIG. 7, FIG. 8, FIG. 9A, FIG. 9B, FIG. 10A, FIG. 10B, FIG. 10C, FIG. 10D, FIG. 10E, FIG. 11A, FIG. 11B, FIG. 11C, FIG. 12, FIG. 13A, and FIG. 13B.

At block 1410, multiple longerons and multiple frames may be deployed utilizing one or more buckled battens from multiple battens coupled with at least one or more longerons from the multiple longerons or one or more frames from the multiple frames; the one or more buckled battens may be offset with respect to one or more interconnecting hinge points between at least two or more longerons from the multiple longerons or two or more frames from the multiple frames such that the one or more buckled battens generate one or more torques around the one or more interconnecting hinge points from a compression force in the one or more buckled battens sufficient to deploy the system. In some embodiments, the multiple longerons and the multiple frames may be deployed utilizing one or more buckled battens coupled with at least one or more longerons from the multiple longerons or one or more frames from the multiple frames and offset with respect to at least a hinge point interconnecting two or more longerons from the multiple longerons or at least a hinge point interconnecting two or more frames from the multiple frames at a length that generates a torque around at least the hinge point interconnecting the two or more longerons from the multiple longerons or the hinge point interconnecting the two or more frames from the multiple frames from the compression force in the one or more buckled batten for deployment of the system.

Some embodiments of the method 1400 include utilizing one or more deployment tethers that spool out during deployment to control the deployment of the multiple frames and the multiple longerons.

In some embodiments of the method 1400, deploying the multiple frames includes sequentially deploying each frame from the multiple frames from a stowed state. In some embodiments, deploying each frame from the multiple frames from the stowed state utilizes one or more sequencers. In some embodiments, utilizing at least one of the one or more sequencers includes hooking a hooked lever with a pivot around at least a portion of a pin in a stowed state. In some embodiments, the pivot of the hooked lever is coupled with a first frame from the multiple frames and a hook of the hooked lever couples with at least the portion of the pin that is coupled with a second frame from the multiple frames such that the hooked lever releases from the pin through contact between the hooked lever and a stop coupled with the first frame when the first frame fully deploys. In some embodiments, the pivot of the hooked lever is coupled with a first foldable longeron from the multiple longerons and a hook of the hooked lever couples with a pin that is coupled with a second foldable longeron from the multiple longerons such that the hooked lever is released from the pin through contact with a portion of the first foldable longeron as the first foldable longeron fully deploys. In some embodiments, at least one of the one or more sequencers includes at least one or more pins or one or more sockets such that: a respective pin coupled with a respective frame rotates in a respective socket of another one of the frames during deployment; and the respective pin is released from the respective socket to release the respective frame.

In some embodiments of the method 1400, deploying the multiple longerons includes unfolding each respective longeron from the multiple longerons during deployment. Some embodiments of the method 1400 include orienting a hinge axis coupled with at least one longeron from the multiple longerons substantially perpendicular to a hinge axis coupled with two or more frames from the multiple frames that ensures synchronous deployment of the system.

Some embodiments of the method 1400 include tensioning one or more diagonals utilizing one or more of the buckled battens at full deployment. Some embodiments include aligning one or more battens from the multiple battens with at least the hinge point interconnecting the two or more longerons from the multiple longerons such that the one or more of the buckled battens are tensioned during deployment and are untensioned at full deployment. For example, some embodiments include aligning one or more battens from the multiple battens with respect to one or more interconnecting hinge points between at least two or more longerons from the multiple longerons or two or more frames from the multiple frames such that the one or more battens from the multiple battens are in compression during deployment and uncompressed at full deployment.

Some embodiments of the method 1400 include incorporating one or more warping restraints that interface with one or more of the frames from the multiple frames, one or more of the longerons from the multiple longerons, and one or more of the bucked battens from the multiple battens such that a kinematic motion of the system is restricted and a synchronous deployment of the system is ensured.

In some embodiments of the method 1400, least one buckled batten from the one or more buckled battens is coupled with a first longeron from the multiple longerons and a second longeron from the multiple longerons such that the at least one batten is offset with respect to a hinge point of the first longeron and a hinge point of the second longeron such that the at least one batten is in compression during deployment.

Some embodiments of the method 1400 include coupling the multiple frames with each other utilizing one or more hinges to a Z-fold configuration in a stowed state. In some embodiments, at least one of the one or more hinges rotate around a pivot point that is offset opposite from an outer face of a first frame from the multiple frames and from an outer face of a second frame from the multiple frames such that the first frame and the second frame make contact between a cup coupled with the first frame and a cone coupled with a second frame at an end of deployment and a spring preloads an interface between the cup and the cone. In some embodiments, at least one of the one or more hinges includes a first hinge axis that rotates around a pivot point that is offset neighboring to an outer face of a first frame of the multiple frames and an outer face of a second frame of the multiple frames and a second hinge axis that rotates the first hinge axis away from the outer face of the first frame and the outer face of the second frame as the first frame and the second frame deploy.

These embodiments may not capture the full extent of combination and permutations of materials and process equipment. However, they may demonstrate the range of applicability of the methods, devices, and/or systems. The different embodiments may utilize more or less stages than those described.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various stages may be added, omitted, or combined. Also, features described with respect to certain embodiments may be combined in various other embodiments. Different aspects and components of the embodiments may be combined in a similar manner. Also, it should be emphasized that technology evolves and, thus, many of the components are exemplary in nature and should not be interpreted to limit the scope of the embodiments.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which may be depicted as a flow diagram or block diagram or as stages. Although each may describe the operations as a sequential process, many of the operations can be performed in parallel or concurrently. In addition, the order of the operations may be rearranged. A process may have additional stages not included in the figure.

Having described several embodiments, it will be recognized by those of skill in the art that various modifications, alternative constructions, and equivalents may be used without departing from the spirit of the different embodiments. For example, the above elements may merely be a component of a larger system, wherein other rules may take precedence over or otherwise modify the application of the different embodiments. Also, a number of stages may be undertaken before, during, or after the above components are considered. Accordingly, the above description should not be taken as limiting the scope of the different embodiments.

What is claimed is:

1. A system comprising:
    a plurality of frames configured to support a plurality of elements;
    a plurality of longerons;
    a plurality of diagonals coupled with the plurality of longerons; and
    a plurality of battens, wherein one or more battens from the plurality of battens are coupled with at least one or more longerons from the plurality of longerons and one or more frames from the plurality of frames such that the respective batten is offset with respect to at least a hinge point between the respective longeron and another longeron from the plurality of longerons at least along a length of the respective longeron or the respective batten is offset with respect to at least a hinge point between the respective frame and another frame from the plurality of frames along a length of the respective frame;
    wherein the one or more battens from the plurality of battens are buckled at least during deployment of the system, wherein each of the one or more battens from the plurality of battens comprises a bowed configuration when buckled that facilitates generation of one or more torques for deployment of the system.

2. A system comprising:
    a plurality of frames configured to support a plurality of elements;
    a plurality of longerons;
    a plurality of diagonals coupled with the plurality of longerons; and
    a plurality of battens, wherein one or more battens from the plurality of battens are coupled with at least one or more longerons from the plurality of longerons and one or more frames from the plurality of frames such that the respective batten is offset with respect to at least a hinge point between the respective longeron and another longeron from the plurality of longerons at least along a length of the respective longeron or the respective batten is offset with respect to at least a hinge point between the respective frame and another frame from the plurality of frames along a length of the respective frame;
    wherein one or more of the battens from the plurality of battens are buckled at least at the end of deployment of the system, wherein each of the one or more battens from the plurality of battens comprises a bowed configuration when buckled that facilitates exertion of one or more forces to provide tension to one or more diagonals from the plurality of diagonals.

3. The system of claim 1, further comprising one or more warping restraints that interface with one or more of the frames from the plurality of frames, one or more of the longerons from the plurality of longerons, and one or more of the battens from the plurality of battens such that a kinematic motion of the system is restricted and a synchronous deployment of the system is ensured.

4. The system of claim 3, wherein the one or more warping restraints include a planar assembly of articulating members that have freedom to at least extend in length while being resistant to at least lateral bending or torsional deformation such that the planar assembly of articulating members are configured to at least expand or distort in a plane of the articulating members and are restricted from warping out of the plane of the articulating members.

5. The system of claim 1, further comprising one or more deployment tethers configured to control a deployment rate of the system, wherein the one or more deployment tethers are deployed via at least one drive motor.

6. The system of claim 1, wherein the plurality of longerons are separated by the plurality of battens from the plurality of frames to provide depth in a deployed state to maintain alignment of the plurality of deployed frames within a common plane.

7. The system of claim 1, wherein the plurality of longerons include a plurality of foldable longerons.

8. The system of claim 7, wherein a hinge axis coupled with at least one foldable longeron from the plurality of foldable longerons is substantially perpendicular to a hinge axis coupled with two or more frames from the plurality of frames.

9. The system of claim 1, wherein the plurality of frames are coupled with each other to form a Z-fold configuration in a stowed state.

10. The system of claim 9, wherein the plurality of frames are coupled with each other utilizing one or more hinges.

11. The system of claim 10, wherein at least one of the one or more hinges rotate around a pivot point that is offset opposite from an outer face of a first frame from the plurality frames and from an outer face of a second frame from the plurality of frames such that the first frame and the second frame make contact between a cup coupled with the first frame and a cone coupled with a second frame at an end of deployment and a spring preloads an interface between the cup and the cone.

12. A system comprising:
    a plurality of frames configured to support a plurality of elements;
    a plurality of longerons;
    a plurality of diagonals coupled with the plurality of longerons; and
    a plurality of battens, wherein one or more battens from the plurality of battens are coupled with at least one or more longerons from the plurality of longerons and one or more frames from the plurality of frames such that the respective batten is offset with respect to at least a hinge point between the respective longeron and another longeron from the plurality of longerons at least along a length of the respective longeron or the respective batten is offset with respect to at least a hinge point between the respective frame and another frame from the plurality of frames along a length of the respective frame;

wherein the plurality of frames are coupled with each other to form a Z-fold configuration in a stowed state;

wherein the plurality of frames are coupled with each other utilizing one or more hinges; and wherein at least one of the one or more hinges includes a first hinge axis that rotates around a pivot point that is offset neighboring to an outer face of a first frame of the plurality of frames and an outer face of a second frame of the plurality of frames and a second hinge axis that rotates the first hinge axis away from the outer face of the first frame and the outer face of the second frame as the first frame and the second frame deploy.

13. The system of claim 1, wherein one or more battens from the plurality of battens are aligned with at least the hinge point between the respective longeron and the other longeron from the plurality of longerons or the hinge point between the respective frame and the other frame from the plurality of frames such that the one or more battens from the plurality of battens are in compression during deployment and uncompressed at full deployment.

14. The system of claim 1, wherein the plurality of frames include a plurality of beams interconnected in a planar arrangement.

15. The system of claim 1, wherein the plurality of elements include at least a plurality of radio-frequency transmission elements or a plurality of photovoltaic energy conversion elements.

16. The system of claim 1, further comprising one or more sequencers.

17. The system of claim 16, wherein at least one of the one or more sequencers includes a hooked lever with a pivot such that the hooked lever hooks around at least a portion of a pin in a stowed state.

18. The system of claim 17, wherein the pivot of the hooked lever is coupled with a first frame from the plurality of frames and a hook of the hooked lever couples with at least the portion of the pin that is coupled with a second frame from the plurality of frames such that the hooked lever releases from the pin through contact between the hooked lever and a stop coupled with the first frame when the first frame fully deploys.

19. The system of claim 17, wherein the pivot of the hooked lever is coupled with a first foldable longeron from the plurality of longerons and a hook of the hooked lever couples with a pin that is coupled with a second foldable longeron from the plurality of longerons such that the hooked lever is released from the pin through contact with a portion of the first foldable longeron as the first foldable longeron fully deploys.

20. The system of claim 1, wherein at least one batten from the plurality of battens is directly coupled with a first longeron from the plurality of longerons and a second longeron from the plurality of longerons such that the at least one batten is offset with respect to a hinge point of the first longeron and a hinge point of the second longeron such that the at least one batten is in compression during deployment.

21. The system of claim 2, further comprising one or more sequencers.

* * * * *